(12) United States Patent
Yadav et al.

(10) Patent No.: US 11,622,313 B1
(45) Date of Patent: Apr. 4, 2023

(54) METHODS AND SYSTEMS FOR TRANSITIONING BETWEEN CLIENT-LESS AND CLIENT-BASED NETWORK CONNECTIVITY TO A SECURE ACCESS SERVICE EDGE (SASE) DOMAIN

(71) Applicant: Versa Networks, Inc., San Jose, CA (US)

(72) Inventors: Chitresh Yadav, Frisco, TX (US); Rahul Vaidya, Sunnyvale, CA (US); Apurva Mehta, Cupertino, CA (US)

(73) Assignee: Versa Networks, Inc., San Jose, CA (US)

( * ) Notice: Subject to any disclaimer, the term of this patent is extended or adjusted under 35 U.S.C. 154(b) by 88 days.

(21) Appl. No.: 17/486,370

(22) Filed: Sep. 27, 2021

(51) Int. Cl.
*H04W 40/24* (2009.01)
*H04W 12/086* (2021.01)
*H04W 12/30* (2021.01)
*H04W 40/36* (2009.01)

(52) U.S. Cl.
CPC ....... *H04W 40/248* (2013.01); *H04W 12/086* (2021.01); *H04W 12/35* (2021.01); *H04W 40/36* (2013.01)

(58) Field of Classification Search
CPC ............. H04W 40/248; H04W 12/086; H04W 12/35; H04W 40/36
See application file for complete search history.

(56) References Cited

U.S. PATENT DOCUMENTS

| 2007/0123238 | A1* | 5/2007 | Jagadeesan | H04M 3/42246 455/415 |
| 2018/0367574 | A1 | 12/2018 | Verma et al. | |
| 2021/0067560 | A1 | 3/2021 | Verma et al. | |
| 2021/0112401 | A1 | 4/2021 | Chadwick et al. | |
| 2021/0152567 | A1* | 5/2021 | Huston, III | H04L 63/20 |
| 2021/0336934 | A1* | 10/2021 | Deshmukh | H04L 63/105 |
| 2022/0353244 | A1* | 11/2022 | Kahn | H04L 63/0823 |

OTHER PUBLICATIONS

Digi International, "Digi Connect® Application GuidE Cellular IP Connections (Uncovered)", Jul. 18, 2005, 7 pgs.
Mehta, Kumar et al. "SASE for Dummies", Versa Networks Special Edition, 2021, 79 pgs.

* cited by examiner

*Primary Examiner* — Hashim S Bhatti
(74) *Attorney, Agent, or Firm* — Loza & Loza, LLP

(57) ABSTRACT

Method and systems for transitioning a wireless device between client-less connectivity and client-based connectivity are disclosed. In an embodiment, a method for transitioning a wireless device between client-less connectivity and client-based connectivity involves forwarding traffic from a wireless device through a SASE domain, receiving a request for information related to a SASE gateway in the SASE domain from the wireless device, transmitting information related to the SASE gateway from the SASE domain to the wireless device in response to the request, and transitioning the wireless device between client-less connectivity to the SASE gateway and client-based connectivity to the SASE gateway.

16 Claims, 18 Drawing Sheets

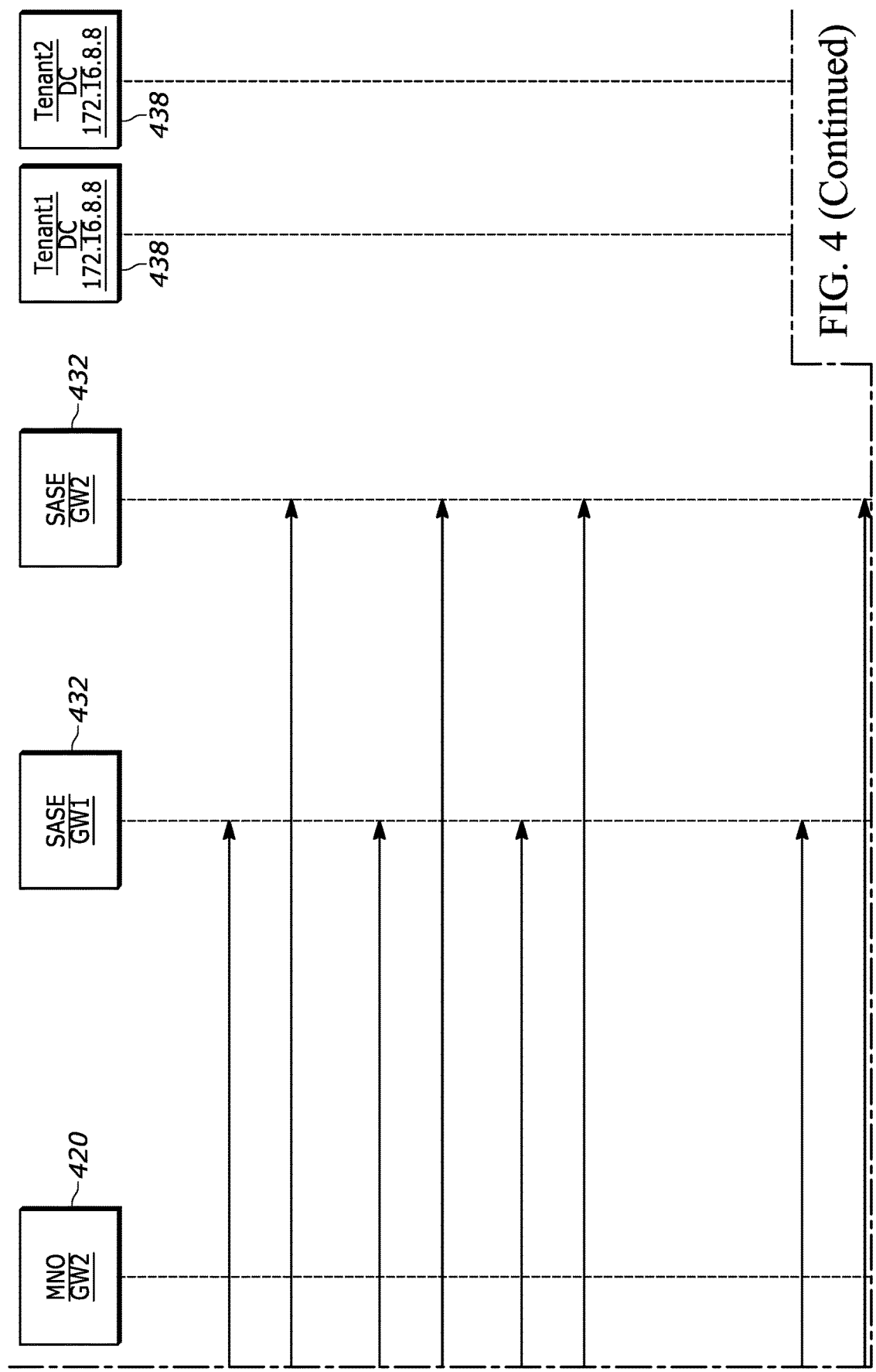

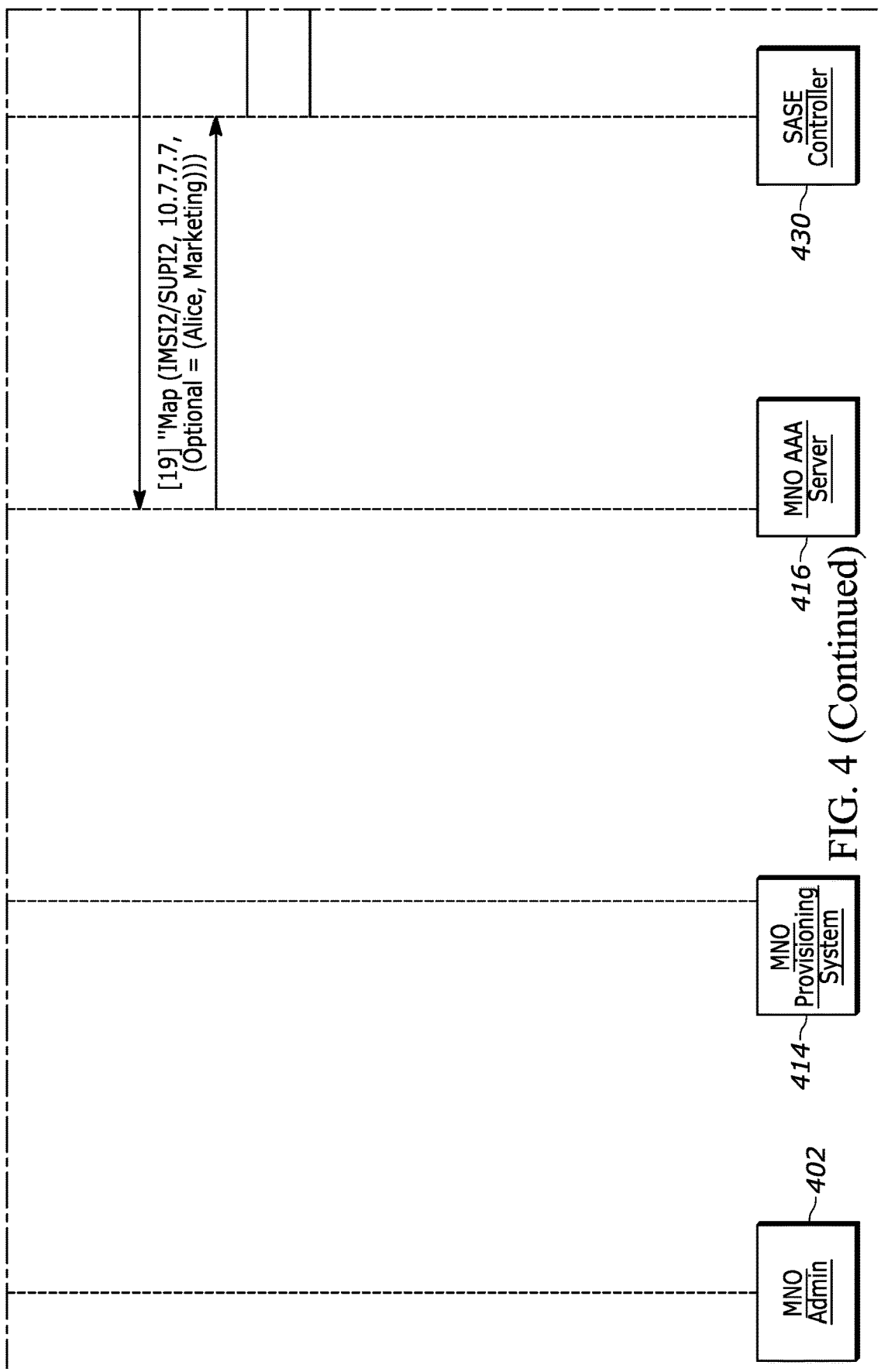

METHODS AND SYSTEMS FOR TRANSITIONING BETWEEN CLIENT-LESS AND CLIENT-BASED NETWORK CONNECTIVITY TO A SECURE ACCESS SERVICE EDGE (SASE) DOMAIN

BACKGROUND

Secure Access Service Edge (SASE) is a cloud native technology that establishes network security as an integrated, embedded function of an enterprise network. SASE combines SD-WAN networking and embedded security capabilities in a cloud-native manner that shifts security focus from traffic flow-centric to identity-centric. Although SASE technology provides many benefits, SASE implementations typically rely on software clients installed on devices to enable remote access to an enterprise network. While software clients enable authentication to a SASE, the demands for mobile access and an explosion in Internet-of-Things (IoT) endpoints can make client-based access control inefficient and/or impractical.

SUMMARY

Method and systems for transitioning a wireless device between client-less connectivity and client-based connectivity are disclosed. In an embodiment, a method for transitioning a wireless device between client-less connectivity and client-based connectivity involves forwarding traffic from a wireless device through a SASE domain, receiving a request for information related to a SASE gateway in the SASE domain from the wireless device, transmitting information related to the SASE gateway from the SASE domain to the wireless device in response to the request, and transitioning the wireless device between client-less connectivity to the SASE gateway and client-based connectivity to the SASE gateway.

In an embodiment, transmitting information related to the SASE gateway from the SASE domain to the wireless device involves transmitting an IP address or a Fully Qualified Domain Name (FQDN) from the SASE domain to the wireless device.

In an embodiment, transitioning the wireless device between client-less connectivity to the SASE gateway and client-based connectivity to the SASE gateway involves transitioning the wireless device from client-less connectivity to the SASE gateway to client-based connectivity to the SASE gateway, and wherein the wireless device provides an access ID and IP address to the SASE domain.

In an embodiment, The method of claim 1, the request for information related to the SASE gateway is sent from the wireless device after the wireless device has established client-less connectivity to the SASE gateway, and wherein transitioning the wireless device involves transitioning the wireless device from the client-less connectivity to client-based connectivity.

In an embodiment, the client-less connectivity to the SASE gateway is established only after a SIM-based authentication with an MNO.

In an embodiment, the client-less connectivity of the wireless device to the SASE gateway involves receiving an access ID-to-IP address mapping at the SASE domain, the access ID-to-IP address mapping corresponding to the wireless device.

In an embodiment, the access ID includes at least one of a subscriber identity and device identifier and wherein the IP address is assigned by the MNO.

In an embodiment, transitioning the wireless device between client-less connectivity to the SASE gateway and client-based connectivity to the SASE gateway involves transitioning the wireless device from client-based connectivity to the SASE gateway to client-less connectivity to the SASE gateway, and wherein the wireless device initiates a connection to an MNO and provides the information related to the SASE gateway to the MNO.

In an embodiment, the client-based connectivity utilizes an IP address that corresponds to the wireless device and wherein the MNO learns the IP address from the SASE domain and uses the same IP address for the client-less connectivity.

In an embodiment, the MNO implements a SIM-based authentication of the wireless device.

In an embodiment, transmitting information related to the SASE gateway from the SASE domain to the wireless device involves transmitting an IP address or an FQDN from the SASE domain to the wireless device, and further comprising transmitting the IP address or the FQDN from the wireless device to the MNO domain.

In an embodiment, the request for information related to the SASE gateway is sent from the wireless device after the wireless device has established client-based connectivity, to the SASE gateway, and wherein transitioning the wireless device involves transitioning the wireless device from the client-based connectivity to client-less connectivity.

In an embodiment, the client-less connectivity to the SASE gateway is established only after a SIM-based authentication with an MNO.

In an embodiment, the SIM-based authentication involves at least one of a subscriber identity and device identifier and wherein the IP address is assigned by the MNO.

In another embodiment, a non-transitory computer readable medium that stores computer readable instructions, which when executed on one or more processors, implements a method for providing secure network connectivity, is disclosed. The method involves forwarding traffic from a wireless device through a SASE domain, receiving a request for information related to a SASE gateway in the SASE domain from the wireless device, transmitting information related to the SASE gateway from the SASE domain to the wireless device in response to the request, and transitioning the wireless device between client-less connectivity to the SASE gateway and client-based connectivity to the SASE gateway.

In another embodiment, a system for transitioning a wireless device between client-less connectivity and client-based connectivity is disclosed. The system includes at least one processor and memory that stores computer readable instructions, which when executed on one or more processors, implements a SASE controller and a SASE gateway that are configured to implement a method for providing secure network connectivity, the method involving forwarding traffic from a wireless device through the SASE gateway, receiving a request for information related to the SASE gateway at the SASE controller from the wireless device, transmitting the information related to the SASE gateway from the SASE controller to the wireless device, and transitioning the wireless device between client-less connectivity to the SASE gateway and client-based connectivity to the SASE gateway.

Other aspects and advantages of embodiments of the present invention will become apparent from the following detailed description taken in conjunction with the accompanying drawings.

BRIEF DESCRIPTION OF THE DRAWINGS

Throughout the description, similar reference numbers may be used to identify similar elements.

DETAILED DESCRIPTION

Figure 1:
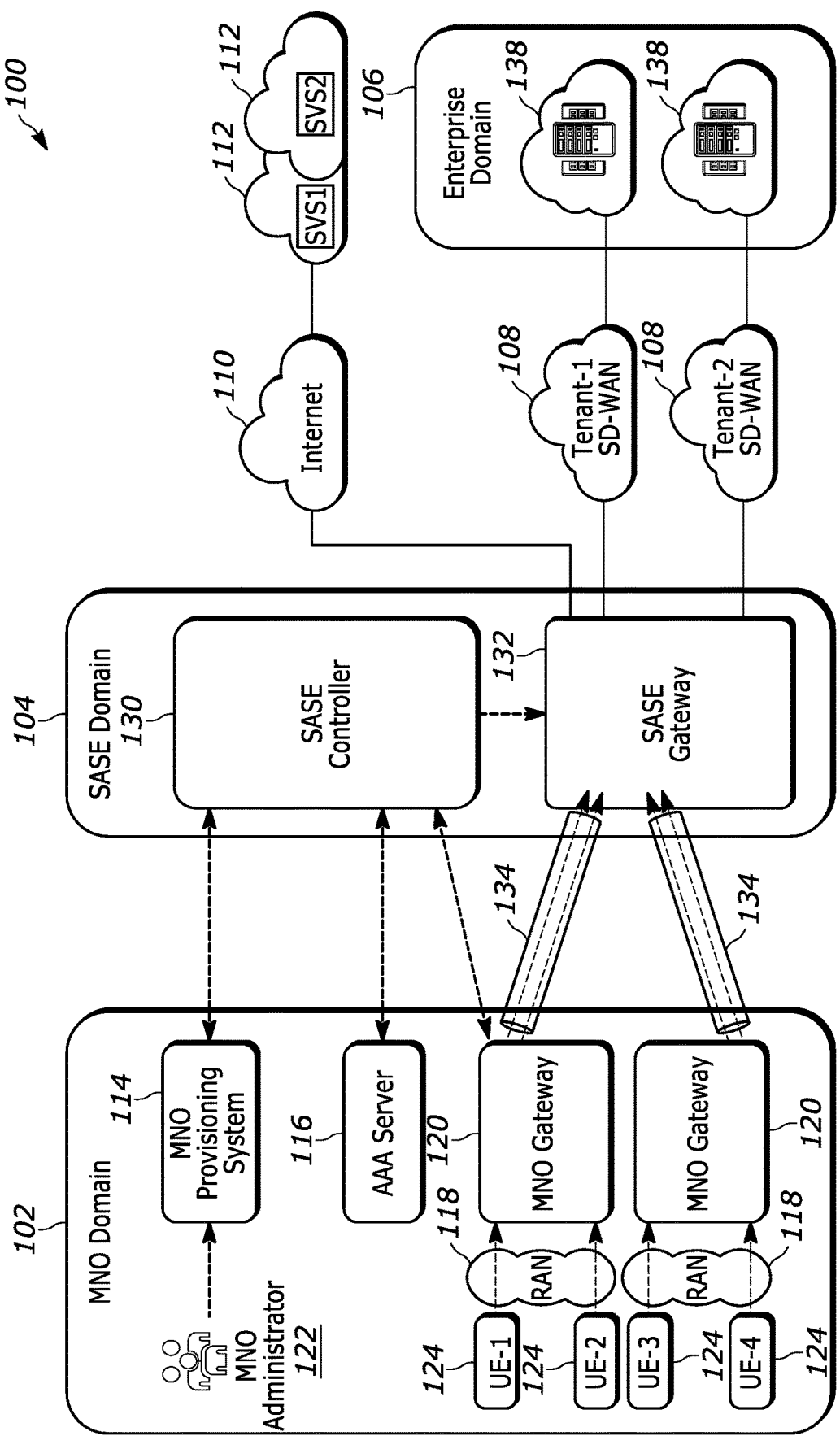
FIG. 1 depicts an example network architecture in which client-less authentication by an MNO is used as a proxy of trust for gaining access to a SASE and ultimately gaining access to other cloud-based resources.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

SASE combines SD-WAN networking technology and embedded security capabilities in a cloud native manner that shifts security focus from traffic flow-centric to identity-centric. Conventional network architectures were designed with specific network policy enforcement points and force routed traffic through the enforcement points to implement security checks. Such enforcement points are often not along the most expedient path and can lead to traffic bottlenecks. SASE takes a different approach in which security enforcement is implemented where the traffic flow is (e.g., at client and application endpoints) as well as at strategically placed gateways and proxies along previously established and efficient paths. SASE enables ubiquitous and direct client to cloud security that is integrated with client to cloud WAN technology to realize a flexible and scalable network architecture that offers embedded security along a software defined perimeter (SDP). A description of SASE can be found in *SASE for Dummies®, Versa Network Special Edition*, John Wiley & Sons, Inc., 2021. In a typical SASE, components including Secure SD-WAN, Secure Web Gateway (SWG), Cloud Access Security Broker (CASB), Zero Trust Network Access (ZTNA), firewalling, Next Generation Firewall (NGFW) and Firewall-as-a-Service (FWaaS) are involved in defining and protecting the SDP. These components of the SASE are engaged in a connection when needed, such as the NGFW, SWG, or CASB, or are fundamental capabilities integral to the fabric of SASE such as SD-WAN and ZTNA. The components of the SASE along with SASE clients installed on user devices work together to ensure that only trusted devices can access secure network resources.

Mobile network operators (MNOs) provide data connections for a wide range of mobile devices including smart phones, pad computers, and laptop computers over a wide geography. With the development of 5G wireless technologies, it is expected that MNOs will also provide network connectivity to a large number of 5G devices, including, for example, IoT devices. As described above, a fundamental aspect of SASE technology is providing network access to only trusted devices. When a device is not equipped with a SASE client, determining whether or not a device is trusted can be difficult. It has been realized that techniques implemented by MNOs to control access to their wireless networks can be used as a proxy of trust for gaining access to network resources that are secured by a SASE. For example, the Subscriber Identification Module (SIM)-based access control of an MNO can be relied upon as a proxy of trust to allow a client-less mobile device to access an enterprise network via the MNO and a SASE. In accordance with an embodiment of the invention, a technique for providing network connectivity involves receiving from an MNO an access ID and an IP address at a SASE domain, wherein the access ID and the IP address correspond to a wireless device, generating an IP address-to-tenant mapping at the SASE domain by applying the access ID and the IP address to an access ID-to-tenant mapping, and forwarding traffic received at the SASE domain from the wireless device via the MNO according to the IP address-to-tenant mapping. Thus, the authentication procedure implemented by the MNO creates a trusted relationship between the MNO and the wireless device and the trusted relationship between the MNO and the wireless device is leveraged by the SASE domain as a proxy of trust with respect to the wireless device.

FIG. 1 depicts an example network architecture 100 in which client-less authentication by an MNO is used as a proxy of trust for gaining access to a SASE and ultimately gaining access to other cloud-based resources, including an enterprise network. The network architecture depicted in FIG. 1 includes an MNO domain 102, a SASE domain 104, and an enterprise domain 106. The network architecture also depicts tenant specific SD-WANs 108, the Internet 110, and various cloud services 112 (SVS1 and SVS2), e.g., video streaming services, communications services, office productivity services, storage services, and enterprise services.

With reference to FIG. 1, the MNO domain 102 includes an MNO provisioning system 114, an Authentication, Authorization, and Accounting (AAA) server 116, radio access networks (RANs) 118, and MNO gateways 120. The MNO domain may also include a core network that connects between the RANs and the MNO gateways, although the core network is not shown in FIG. 1. The MNO provisioning system is configured to establish access rights and privileges for subscribers and corresponding devices in the MNO domain and can be managed by an MNO administrator 122. The AAA server manages authentication, authorization, and accounting functions of the MNO. The MNO gateways provide access to packet-based data networks including private networks and public networks such as the Internet 110. The MNO gateways may include, for example, Public Data Network Gateways (PDN-GW), 5G User Plane Function (UPF), and/or System Architecture Evolution (SAE) Gateways, or other network components that provide access to broader networks, including, for example, a Packet Data Service Node (PSDN) in a Code-Division Multiple Access (CDMA) based mobile network. The RANs may include base stations, Radio Units (RUs), and baseband units (BBUs) as is known in the field and may implement various different wireless technologies including, for example, Global System for Mobility (GSM), UMTS, E-UTRAN, GPRS, 3G or 4G mobile network.

Devices that are configured to wirelessly connect to the RANs 118 are often referred to as User Equipment 124 or simply "UE" and such devices may be SIM-based or non-SIM-based. The devices (e.g., UEs) may include mobile phones, smartphones, tablets, laptop computers, and wearable devices (e.g., smartwatches). The devices may also include IoT devices.

The SASE domain 104 includes a SASE controller 130 and a SASE Gateway 132. The SASE controller implements control plane functionality within the SASE domain. For example, the SASE controller implements user/device registration operations and manages the generation and distribution of rules for routing traffic through the SASE domain. The SASE gateway implements data plane functionality within the SASE domain. For example, the SASE gateway implements access control and traffic forwarding within the SASE domain. In addition, although only one SASE gateway is shown in FIG. 1, the SASE domain may include multiple SASE gateways distributed throughout the SASE domain. The SASE controller and SASE gateway work in combination to implement SASE functionality, including, for example, Secure Web Gateway (SWG), Denial of Service (DoS), Cloud Access Service Broker (CASB), Data Leak Prevention (DLP), Carrier Grade Network Address Translation (CGNAT), and Zero Trust Network Access (ZTNA). In an embodiment, the SASE controller and SASE gateway are functional entities executed through computer-readable instructions, which functionality can be executed on the same hardware components or distributed amongst hardware components in a network.

The MNO gateways 120 can be connected to the SASE domain using various different techniques including, for example, a direct connection, an SD-WAN network, Generic Routing Encapsulation (GRE) tunnels, and/or IP Security (IPsec) tunnels. In an embodiment, the MNO gateways are configured to direct traffic to the SASE gateway 132 via a tunnel that corresponds to an Access Point Name (APN). As is known in the field, an APN is a name of a gateway between the network of the MNO and another computer network such as the public Internet. Communication pathways between the MNOs and the SASE gateway are represented as tunnels 134 in FIG. 1.

The enterprise domain 120 includes network infrastructure for particular enterprises, also referred to as tenants. For example, an enterprise or tenant may be an entity such as a corporation that maintains an enterprise network 138 or a data center network (DCN) that includes private corporate information such as, for example, customer information, human resources information, accounting information, supply chain information, DevOps information, etc. As used herein, a tenant may refer to an entity such as a corporation that manages and/or maintains an enterprise network and/or a tenant may refer to the network that is managed/maintained by the tenant. The enterprise domain may be accessible via an SD-WAN 108, including, for example, a tenant-specific SD-WAN.

The SASE domain 104 may also provide direct connectivity to the Internet, sometimes referred to as Direct Internet Access (DIA), which may involve providing access to the Internet without first passing traffic through a private network such as an SD-WAN. Direct access to the Internet can be used to access cloud-based services 112 (e.g., SVS1 and SVS2) such as, for example, video streaming services, communications services, office productivity services, storage services, and/or enterprise services.

A technique for implementing secure connectivity of a client-less device via an MNO and a SASE is now described with reference to FIGS. 1-5. With reference to FIG. 1, a function of the SASE domain 104 is to map the IP addresses of packet traffic received from devices 124 (e.g., UEs) in the MNO domain 102 to a corresponding tenant 138 in the enterprise domain 106 in a manner that ensures that the devices in the MNO domain are authorized to access a tenant-specific network (e.g., tenant-specific SD-WANs 108). In an embodiment, the SIM-based access control of an MNO is relied upon as a proxy of trust to allow a client-less mobile device to gain access to an enterprise network via an MNO and a SASE.

Figure 2A:
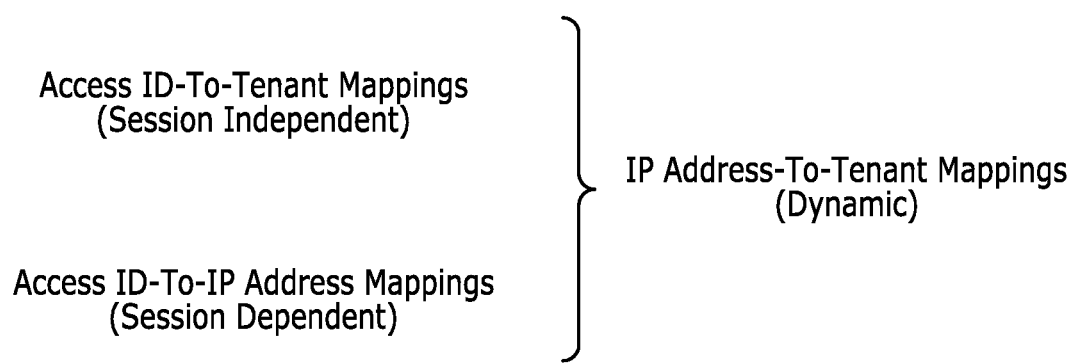
FIG. 2A is a high-level representation of functionality implemented within a SASE domain to ensure that devices in the MNO domain are authorized to access a tenant-specific network.

FIG. 2A is a high-level representation of functionality implemented within a SASE domain to ensure that devices in an MNO domain are authorized to access a tenant-specific network. In the example, a SASE controller within the SASE domain receives access ID-to-tenant mappings that map access IDs used by the MNO to particular tenants that are supported by the SASE domain. Access ID-to-tenant mappings can be established by an administrator of a tenant via, for example, a portal or Application Programming Interfaces (APIs). In an embodiment, an access ID-to-tenant mapping may map an International Mobile Subscriber Identity (IMSI) of a mobile subscriber and/or an International Mobile Equipment Identity (IMEI) of the mobile subscriber to a particular tenant. The access ID-to-tenant mappings do not change on a per-session basis and can be deemed to be session independent.

In an embodiment, an access ID refers to information that is used to gain authenticated and/or authorized access to a network that is controlled by an MNO. An access ID may include SIM-based information such as IMSI, Mobile Station Integrated Services Digital Network (MSISDN), IMEI, 5G Subscription Concealed Identity (SUCI), IMSI-based Subscription Permanent Identifier (SUPI) and non-SIM-based information such as a certificate installed on the device, a USB-based authentication module (e.g., an RSA module), a YUBIKEY, or a biometric-based (e.g., fingerprint, face recognition, iris scan) authentication.

With reference to FIG. 2A, a SASE controller also receives access ID-to-IP address mappings that map access IDs used by the MNO to IP addresses that are assigned on a per-session basis. In an embodiment, an access ID-to-IP address mapping for a particular device is sent by the MNO to the SASE domain only if the device (and optionally the corresponding subscriber) has been authenticated by the MNO. Thereby, the authentication by the MNO can serve as a proxy of trust for the SASE domain. In an example embodiment, a mobile device is assigned an IP address each time a wireless connection is authenticated by the MNO. The IP address may be assigned to the device using a well-known protocol such as Dynamic Host Configuration Protocol (DHCP) or IPv6 StateLess Address Auto Configuration (SLAAC). The access ID-to-IP address mappings may change with each session and can be deemed to be session dependent.

Still referring to FIG. 2A, the SASE controller generates IP address-to-tenant mappings using the access ID-to-tenant mappings and the access ID-to-IP address mappings. The IP address-to-tenant mappings can be deemed to be dynamic in that the IP address-to-tenant mappings change upon changes to the access ID-to-IP address mappings.

Figure 2B:
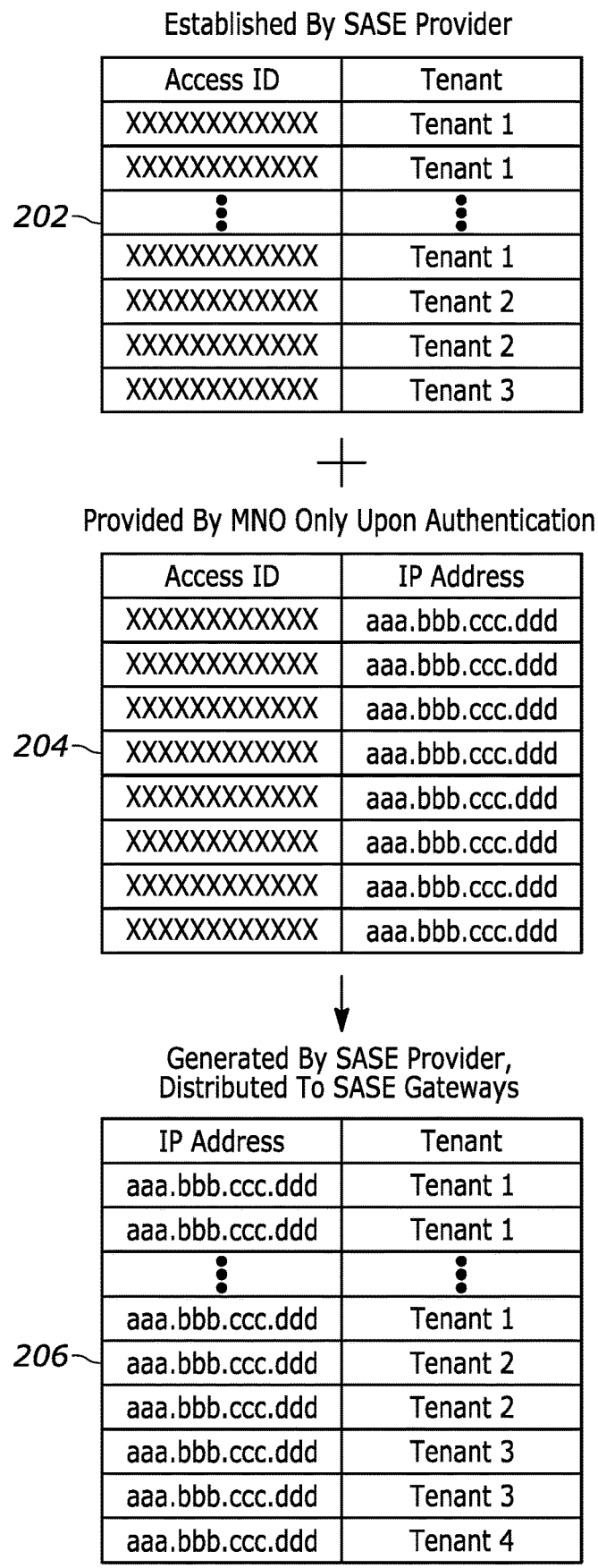
FIG. 2B illustrates the generation of IP address-to-tenant mappings using access ID-to-tenant mappings and access ID-to-IP address mappings.

FIG. 2B illustrates the generation of IP address-to-tenant mappings using access ID-to-tenant mappings and access ID-to-IP address mappings. In particular, FIG. 2B depicts a table (top) that represents access ID-to-tenant mappings 202, a table (middle) that represents access ID-to-IP address mappings 204, and a table (bottom) that represents IP address-to-tenant mappings 206. The access ID-to-tenant mappings may be generated at the MNO provisioning system and provided to the SASE controller.

In an embodiment, the access ID-to-IP address mappings 204 are provided to a SASE controller by the MNO domain. In an embodiment, a particular access ID-to-IP address mapping is provided to the SASE controller only after the MNO is able to authenticate a device that is trying to connect to the mobile network of the MNO. For example, the access ID-to-IP address mapping is provided to the SASE controller only after the MNO authenticates a UE using a SIM-based authentication process. SIM-based authentication processes are client-less authentication processes that are known in the field of mobile networks. Thus, the authentication procedure implemented by the MNO establishes a trusted relationship between the MNO and the wireless device that is accessing the wireless network of the MNO, e.g., accessing the MNO domain. The trusted relationship between the MNO and the wireless device is then leveraged by the SASE domain to provide SASE services as described herein.

In an embodiment, the IP address-to-tenant mappings (FIG. 2B, 206) are generated at a SASE controller by applying a particular access ID-to-IP address mapping to the access ID-to-tenant mappings (FIG. 2B, 202). For example, the SASE controller matches the device's access ID (e.g., access ID=IMSI/IMEI) to an access ID in the access ID-to-tenant mappings to identify a tenant and then maps the IP address of the device to the tenant to generate the IP address-to-tenant mapping. In an embodiment, the IP address-to-tenant mappings is used to learn the tenant to which a particular IP flow belongs. In an embodiment, based on the source IP address of the flow, an access ID (e.g., a device ID such as an IMEI) is identified using the access ID-to-IP addressing mappings (e.g., table 204) and the access ID is then used to find the corresponding tenant using the access ID-to-tenant mappings (e.g., table 202).

Referring back to FIG. 1, in an embodiment, the IP address-to-tenant mappings 206 as shown in FIG. 2B are distributed from the SASE controller 130 to the SASE gateway 132, or SASE gateways, in the SASE domain 104. Although the generation of the IP address-to-tenant mappings is described as being a function of the SASE controller, in another embodiment, the IP address-to-tenant mappings may be generated at the SASE gateway, or SASE gateways, using information received from the SASE controller and/or information received directly from the MNO domain 102.

Figure 3A:
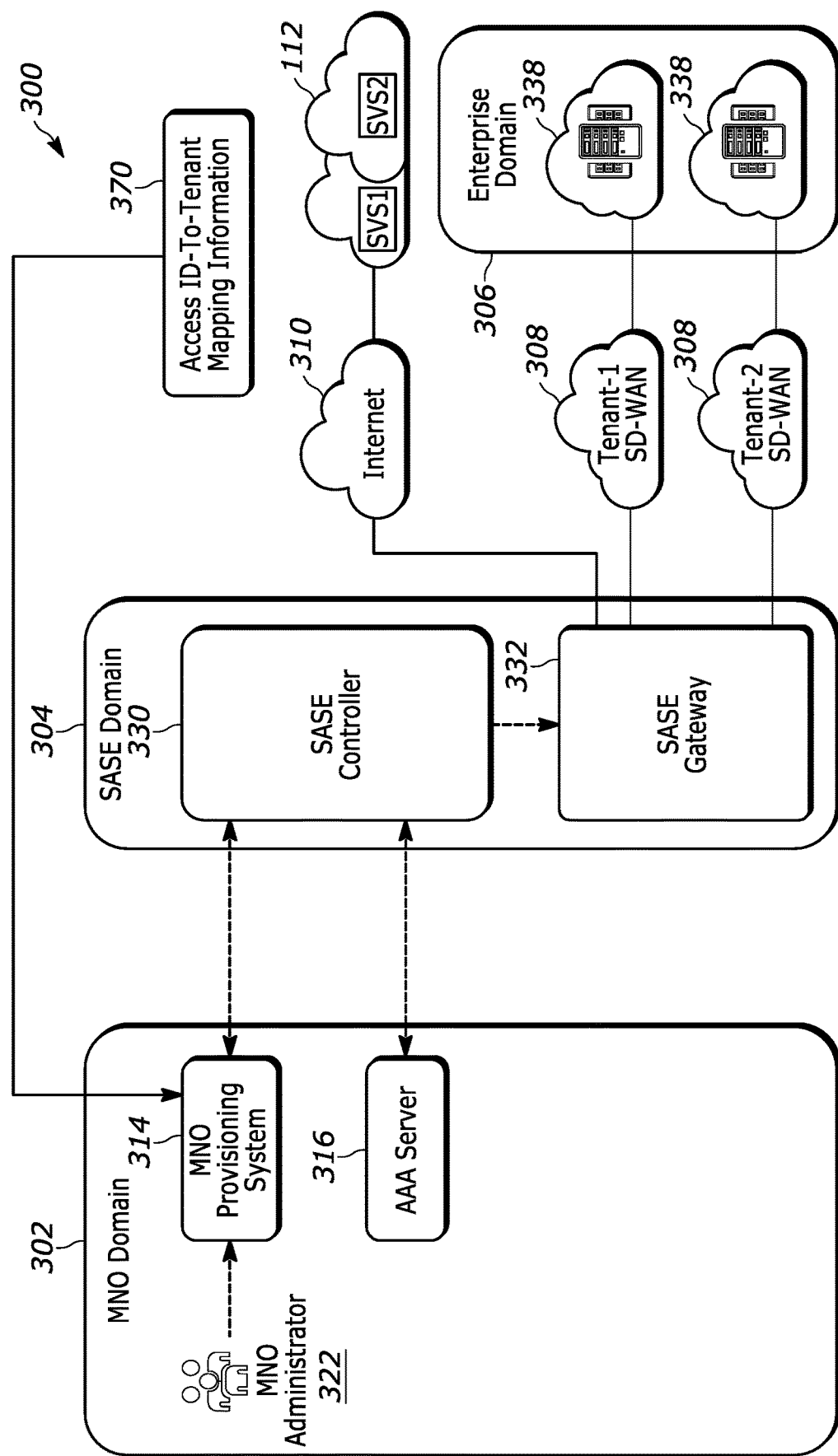
FIG. 3A illustrates an operation in which access ID-to-tenant mapping information is established within the SASE domain.

Various operations of the technique for providing secure connectivity of a client-less device via an MNO and a SASE are now described with reference to FIGS. 3A-3D. With reference to FIG. 3A, in a first operation, access ID-to-tenant mapping information 370 is provided to the MNO domain 302 of the network architecture 300 from, for example, a company, which may be the same as a tenant. For example, a company (e.g., tenant) may communication information about subscribers to the MNO service that are also to be included in the SASE service. In another embodiment, access ID-to-tenant information may be provided by a company directly to the SASE controller, which then communicates information about subscribers that are to be included in the SASE service to the MNO domain 302 and the MNO provisions the device information of devices that are subscribed to the SASE service. The information provided to the MNO domain could include access IDs such as IMSI/IMEI and MSISDN, User information (e.g., name and address of the user), and/or the location of the device (e.g., in case of IoT sensors or other network nodes). In an embodiment, subscriber information is communicated to the SASE controller in the SASE domain from the provisioning system 314 of the MNO domain and the SASE controller registers a specific device, and optionally a particular user/subscriber, to a specific tenant in the enterprise domain 306.

Figure 3B:
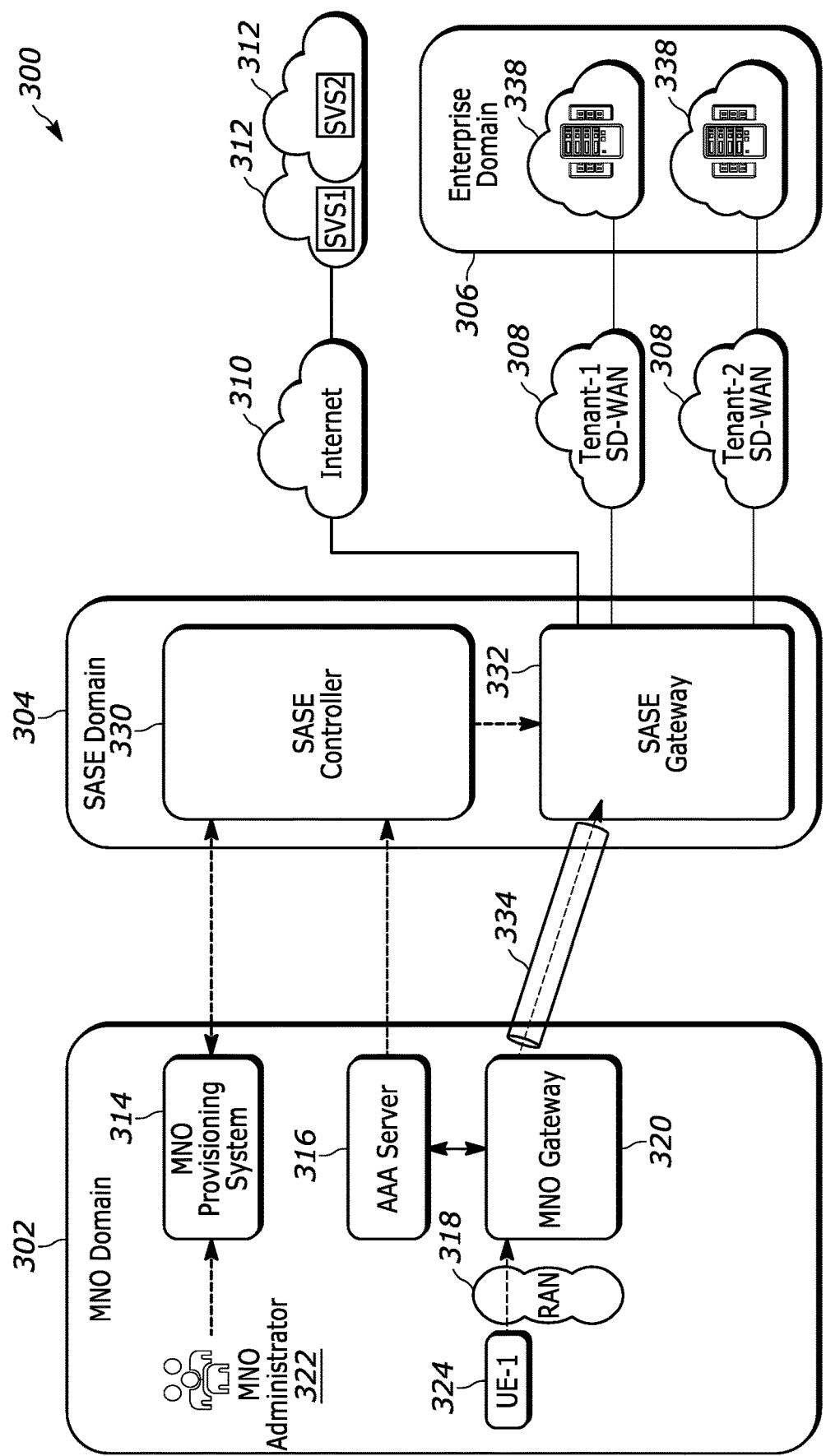
FIG. 3B illustrates an operation in which a device attempts to connect to the network of the MNO via a RAN of the MNO.

With reference to FIG. 3B, in a next operation, a device 324 (e.g., UE-1) attempts to connect to the network of the MNO via a RAN 318 of the MNO domain 302. For example, the device attempts to connect to the trusted network, in this case the RAN of the MNO, using a SIM-based authentication process. Once the device is authenticated, the MNO gateway 320 allocates an IP address to the device and the MNO gateway informs the AAA server 316 of the allocated IP address along with the access ID (e.g., device information such as IMEI and IMSI). Next, the AAA server forwards the allocated IP address and access ID to the SASE controller 330 in the SASE domain 304. Optionally, the MNO gateway can send the IP address and access ID directly to the SASE gateway 332 instead of, or in addition to, sending the information to the SASE controller. The SASE controller (and/or the SASE gateway) can be notified of the IP address and access ID using, for example, Restful API or an AAA Accounting messaging (e.g., a RADIUS Accounting_Start message). Next, the SASE controller correlates the IP address and access ID associated with the device to a tenant using the access ID-to-tenant mapping as described with reference to FIGS. 2A and 2B to generate an IP address-to-tenant mapping. For example, the SASE controller matches the device's access ID (e.g., access ID=IMSI/IMEI) to an access ID in the access ID-to-tenant mappings to identify a tenant and then maps the IP address of the device to the tenant to generate the IP address-to-tenant mapping. Next, the SASE controller distributes the IP address-to-tenant mapping to the SASE gateways in the SASE domain.

Once the device 324 is connected to the network of the MNO, the device can send and receive data. For example, the device can send/receive data to/from the Internet 310 and the enterprise domain 306. Traffic, which is identified at the MNO as traffic that should be handled by the SASE domain, is passed via a tunnel 334 to the SASE domain using a SASE APN. In an embodiment, the MNO provides the APN information to be used with the subscription associated with the device and any user/device that is subscribed to the SASE service is configured with the specific APN. When the MNO gateway (e.g., SAE gateway) receives network traffic corresponding to the APN, the MNO gateway forwards the traffic to the corresponding SASE gateway. In an embodiment, the same SASE APN is used to carry traffic for multiple different tenants to the SASE domain and the SASE gateway can use the IP address-to-tenant mappings to direct traffic to the Internet, to direct traffic to the appropriate tenants in the enterprise domain, and/or to apply appropriate policies to the traffic.

Figure 3C:
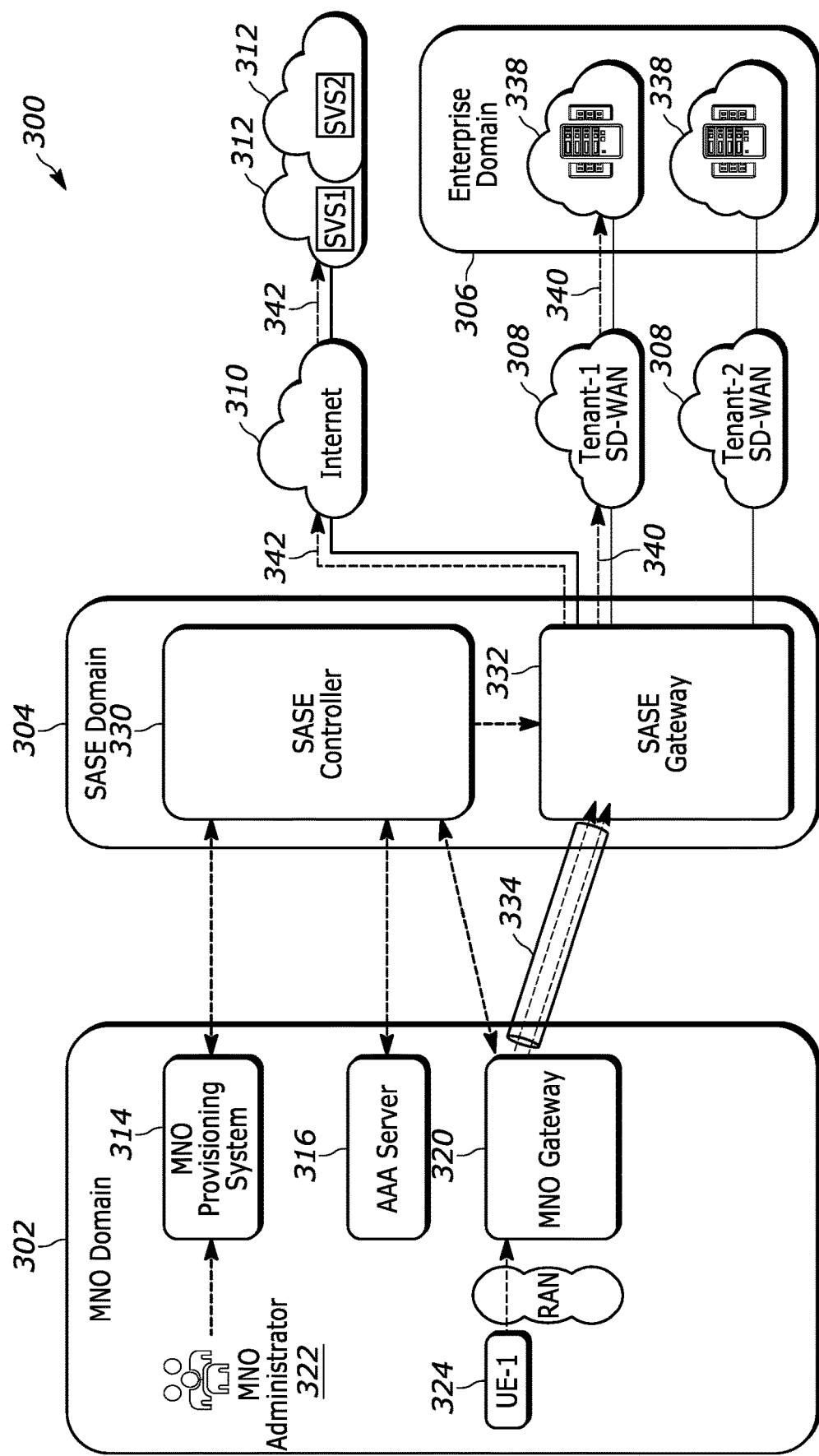
FIG. 3C illustrates traffic being directed from an MNO gateway to the SASE gateway via a tunnel that corresponds to the SASE APN.

In an embodiment, the MNO gateway 320 sends all traffic associated with the SASE APN to the SASE gateway 332. FIG. 3C illustrates traffic being directed from the MNO 320 gateway to the SASE gateway via a tunnel 334 that corresponds to the SASE APN. By associating the traffic of multiple different tenants with the same SASE APN and bundling the traffic in a tunnel as opposed to establishing a private APN for each different tenant, the technique described herein can more easily scale to support a large number of different tenants because all of the traffic for the different tenants is directed to the same SASE APN and communicated in the same tunnel. In an embodiment, multiple different SASE providers may connect to the same MNO. In such a case, a different SASE APN can be established for each different SASE provider. For example, SASE provider A may use SASE $APN_A$ and SASE provider B may use SASE $APN_B$ and the MNO is provisioned to forward traffic for SASE provider A on $APN_A$ and to forward traffic for SASE provider B on $APN_B$.

Upon receiving traffic via a SASE APN, the SASE gateway 332 segregates the traffic to a specific tenant based on the IP address-to-tenant mappings. In an embodiment, traffic 340 that is destined to a tenant in the enterprise domain 306 is sent to the enterprise domain over a secure tunnel (e.g., tenant-specific SD-WAN 308 or IPSec) and traffic 342 that is destined to the Internet is sent as conventional IP traffic. Traffic destined for the Internet could be subjected to a Network Address Translation (NAT) before the packets are sent to the Internet and traffic destined to the enterprise domain could be subjected to a NAT using a pool of IP addresses that are configured for a particular tenant.

Figure 3D:
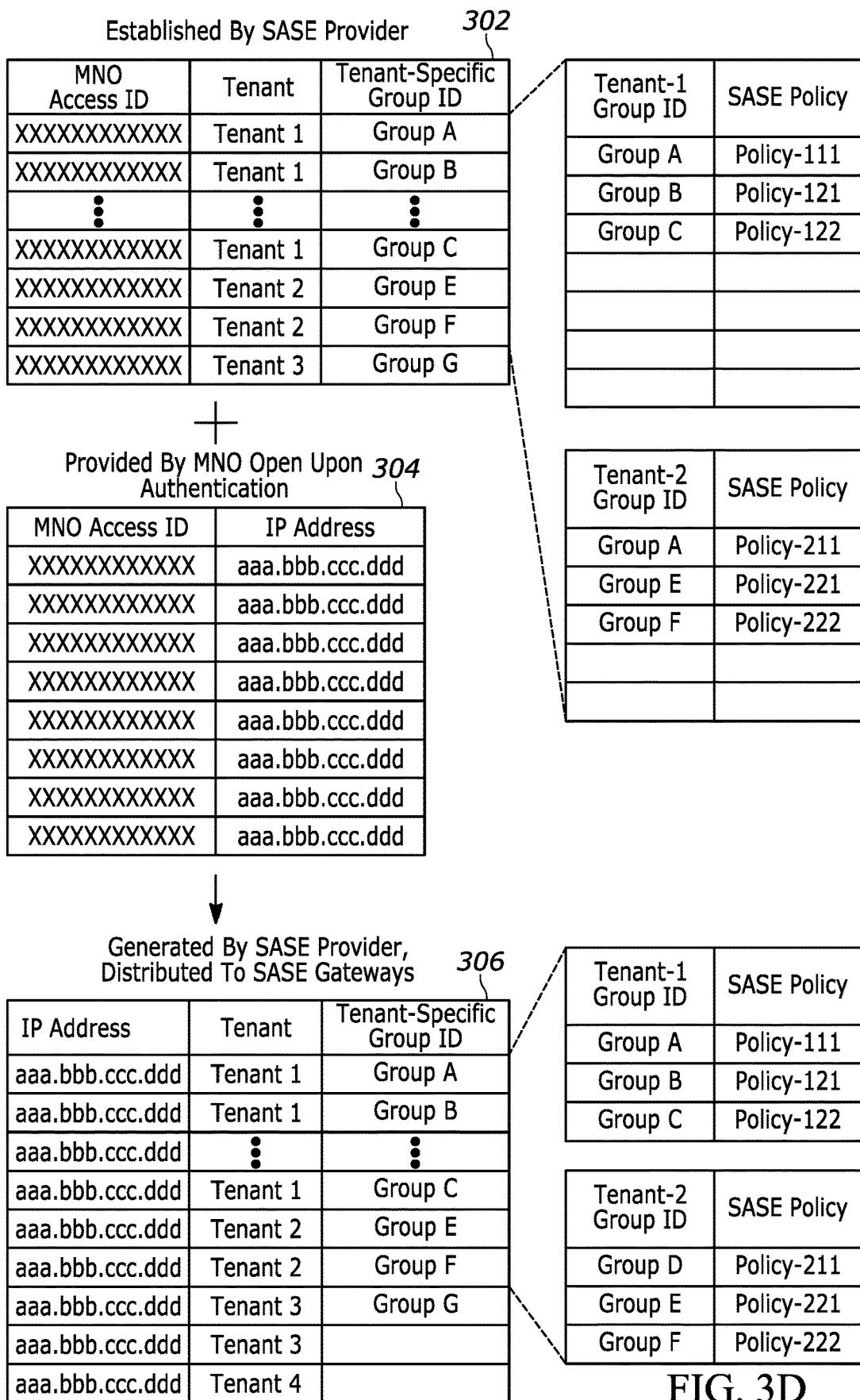
FIG. 3D depicts access ID-to-tenant and IP address-to-tenant mappings that are extended to support tenant-specific groups.

In addition to directing traffic to the appropriate tenants, enhanced services can be implemented in the SASE domain 304 by enumerating different groups within a tenant and applying group-specific SASE policies to the groups. FIG. 3D depicts access ID-to-tenant and IP address-to-tenant mappings 302 and 306 that are extended to support tenant-specific groups. As illustrated in FIG. 3D, tenants may have tenant-specific groups (identified by a tenant-specific GroupID) and each tenant-specific group may have a corresponding SASE policy. Thus, a particular tenant can have various different groups and the groups can have corresponding group-specific SASE policies. Group-specific SASE policies may include context driven UE security, access policy, user/group ID, device type, IP address, geolocation, device operating system, operating system security compliance, Quality of Service (QoS), traffic steering, etc.

The tenant-specific group information could be provisioned along with the tenant information during the provisioning process and the SASE gateway enforces the policies based on the groups defined within a particular tenant. In an example, security cameras of a tenant can be grouped in a tenant-specific group (e.g., group=SEC-CAM) and devices in the tenant-specific group could have access to only a video monitoring application and to a specific IP address segment. Any other communication to or from a device in the group could be blocked. For example, with reference to FIG. 3D, the tenant-specific group for Tenant 1 may be Group B and the corresponding policy is Policy=121.

Figure 4:
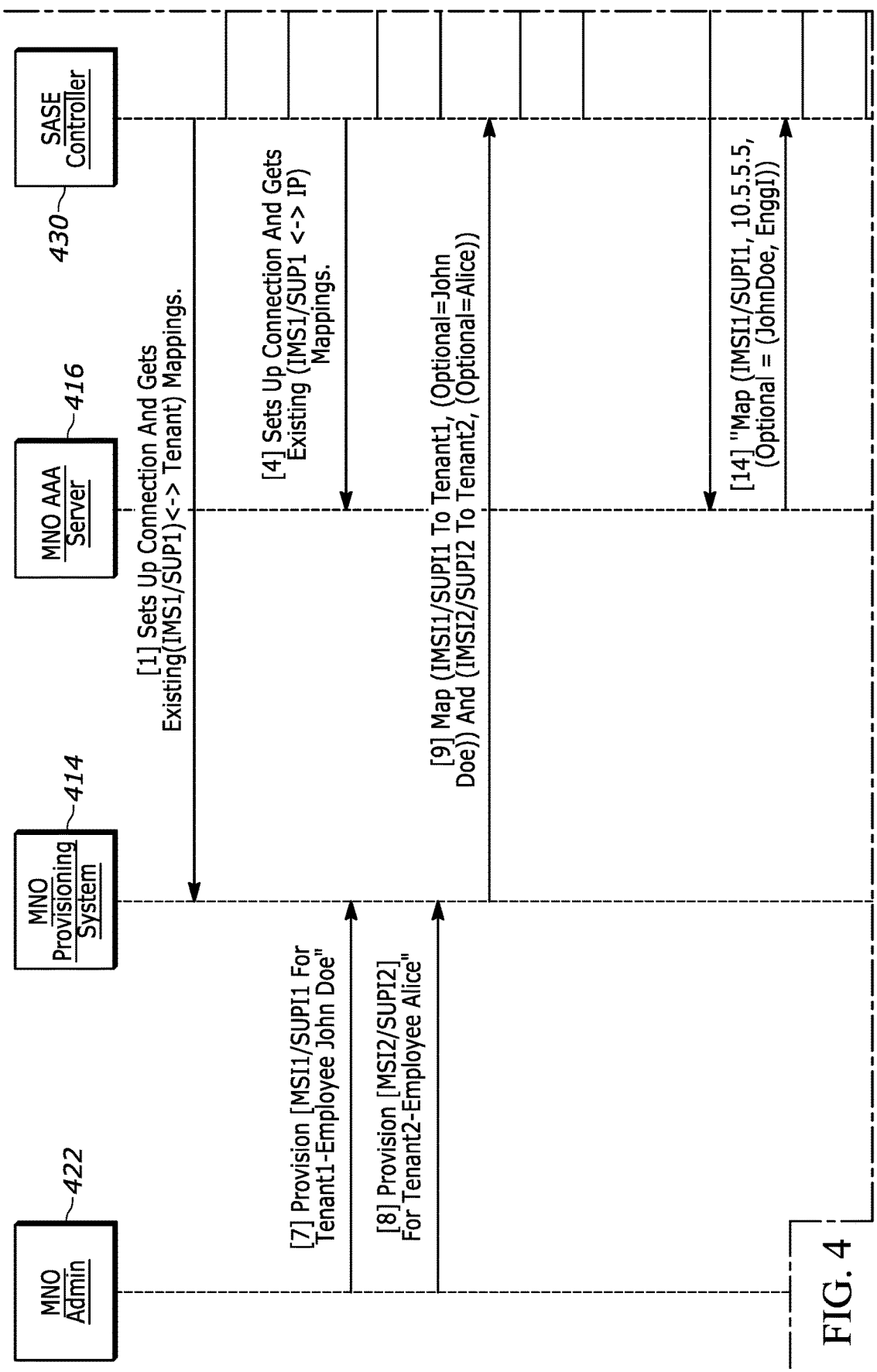
FIG. 4 is a process flow diagram of a technique for secure connectivity that relies on MNO authentication as a proxy of trust.
Figure 4:
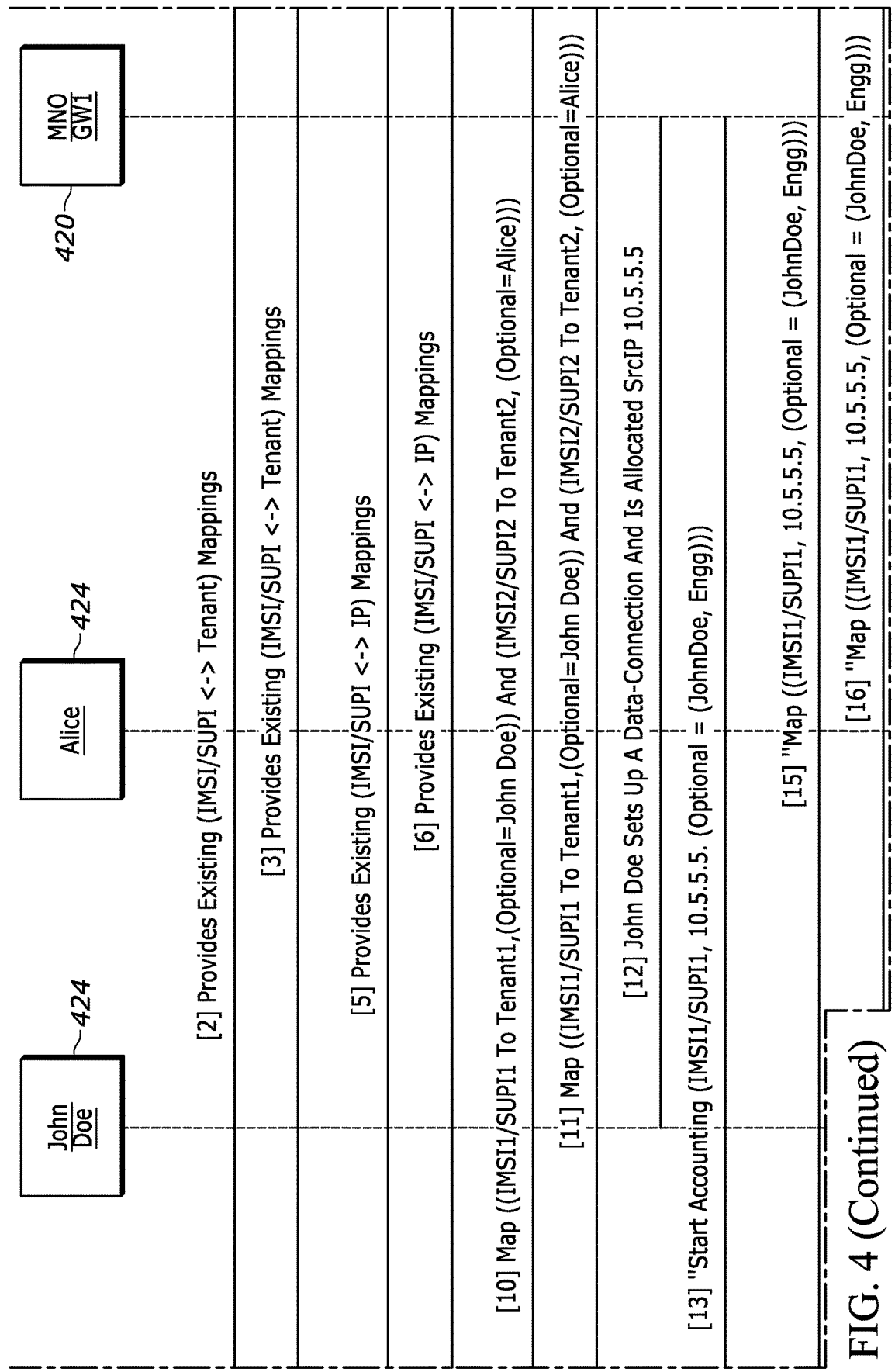
Figure 4:
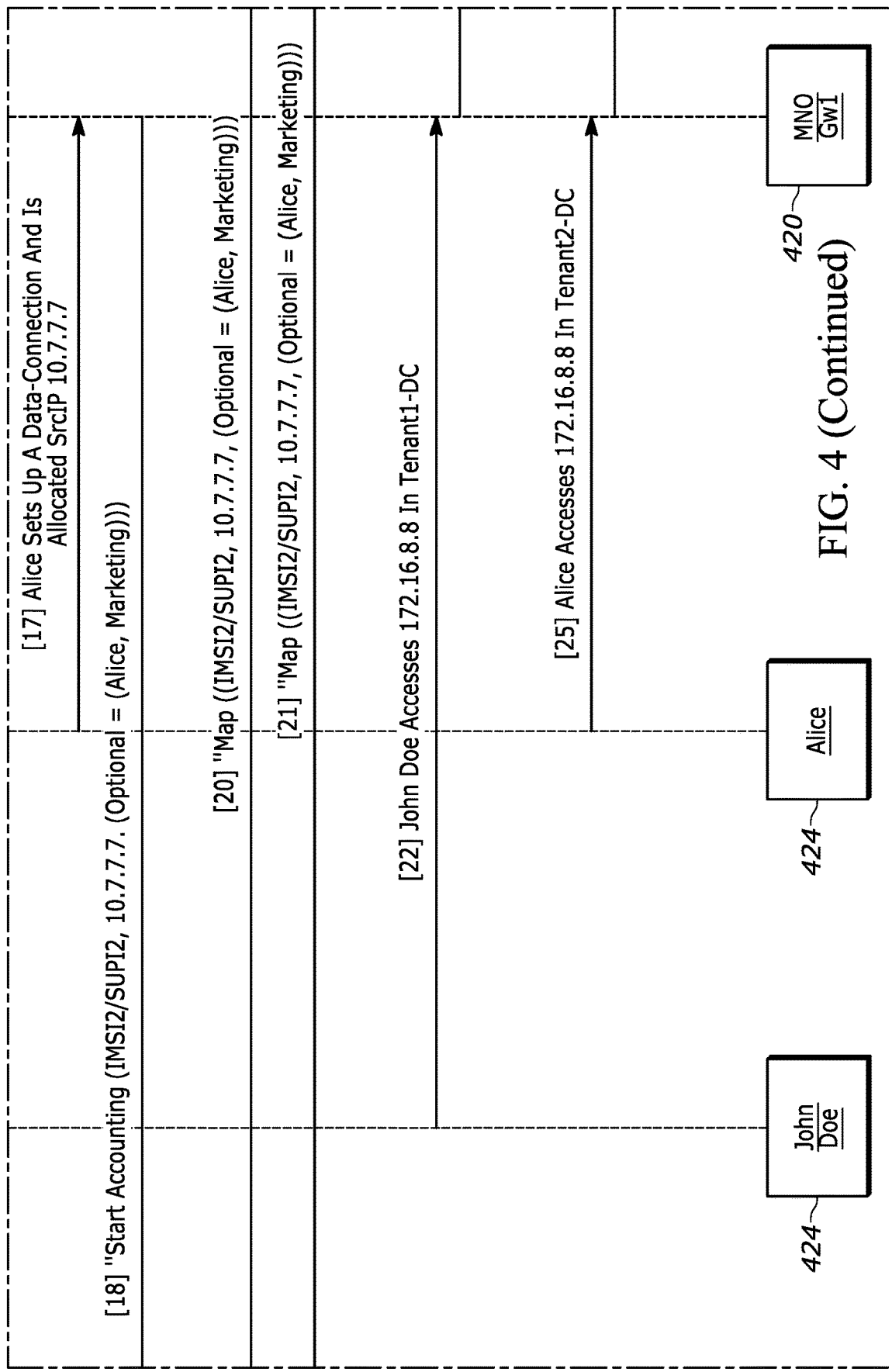
Figure 4:
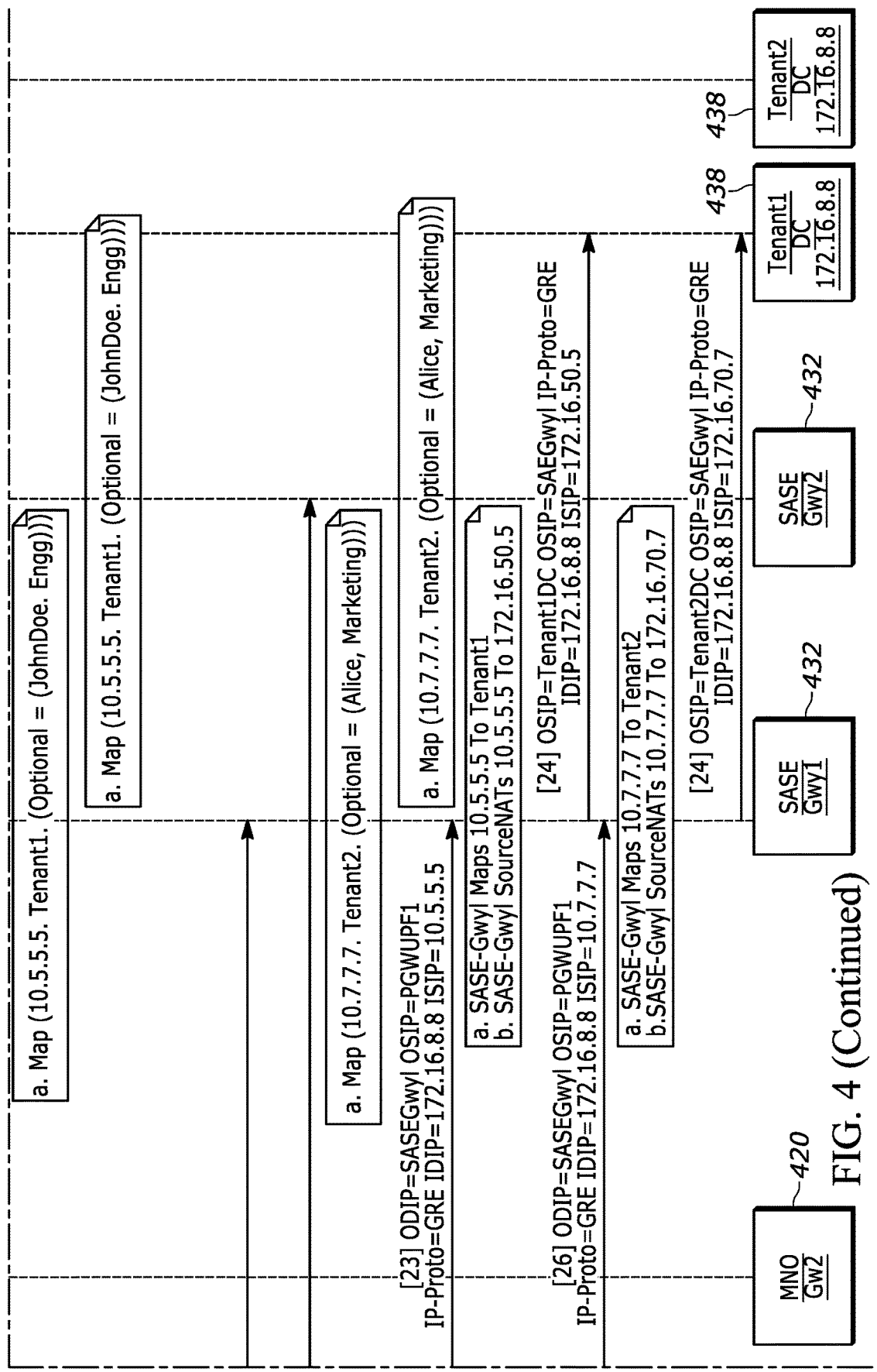

The techniques described above can be deployed across a network architecture that includes multiple MNO gateways, multiple SASE gateways, and multiple tenants-specific DCNs. FIG. 4 is a process flow diagram of a technique for secure connectivity that relies on MNO authentication as a proxy of trust. In the embodiment of FIG. 4, operations are performed amongst elements in a network architecture similar to the network architecture described above. The elements in the network architecture include (from left to right) an MNO administrator 422 (MNO admin), an MNO provisioning system 414, an MNO AAA server 416, a SASE controller 430, a wireless device 424 the corresponds to subscriber "John Doe," a wireless device 424 that corresponds to subscriber "Alice," a first MNO gateway 420 (MNO GW1), a second MNO gateway 420 (MNO GW2), a first SASE gateway 432 (SASE GW1), a second SASE gateway 432 (SASE GW2), a first tenant data center 438 (Tenant1 DC), and a second tenant data center 438 (Tenant2 DC). In the example of FIG. 4, operations amongst the elements of the network are performed in a sequence as indicated by the numbered operations. The sequence of numbered operations are:

(1) Sets up connection and gets existing (IMSI/SUPI<-> Tenant) mappings;

(2) Provides existing (IMSI/SUPI<->Tenant) mappings;

(3) Provides existing (IMSI/SUPI<->Tenant) mappings;

(4) Sets up connection and gets existing (IMSI/SUPI<->IP) mappings;

(5) Provides existing (IMSI/SUPI<->IP) mappings;

(6) Provides existing (IMSI/SUPI <->IP) mappings;

(7) Provision IMSI1/SUPI1 for Tenant1-employee "John Doe";

(8) Provision IMSI2/SUPI2 for Tenant2-employee "Alice";

(9) Map ((IMSI1/SUPI1 to Tenant1, (Optional=John Doe)) and (IMSI2/SUPI2 to Tenant2, (Optional=Alice)));

(10) Map ((IMSI1/SUPI1 to Tenant1, (Optional=John Doe)) and (IMSI2/SUPI2 to Tenant2, (Optional=Alice)));

(11) Map ((IMSI1/SUPI1 to Tenant1, (Optional=John Doe)) and (IMSI2/SUPI2 to Tenant2, (Optional=Alice)));

(12) John Doe sets up a data-connection and is allocated SrcIP 10.5.5.5;

(13) Start Accounting (IMSI1/SUPI1, 10.5.5.5, (Optional=(JohnDoe, Engg)));

(14) Map (IMSI1/SUPI1, 10.5.5.5, (Optional=(JohnDoe, Engg)));

(15) Map (IMSI1/SUPI1, 10.5.5.5, (Optional=(JohnDoe, Engg)));

(16) Map (IMSI1/SUPI1, 10.5.5.5, (Optional=(JohnDoe, Engg))), at SASE GW1-Map (10.5.5.5, Tenant1, (Optional=(JohnDoe, Engg))) and at SASE GW2-Map (10.5.5.5, Tenant1, (Optional=(JohnDoe, Engg)));

(17) Alice sets up a data-connection and is allocated SrcIP 10.7.7.7;

(18) Start Accounting (IMSI2/SUPI2, 10.7.7.7, (Optional=(Alice, Marketing)));

(19) Map (IMSI2/SUPI2, 10.7.7.7, (Optional=(Alice, Marketing)));

(20) Map (IMSI2/SUPI2, 10.7.7.7, (Optional=(Alice, Marketing)));

(21) Map (IMSI2/SUPI2, 10.7.7.7, (Optional=(Alice, Marketing))), at SASE GW1-Map (10.7.7.7, Tenant2, (Optional=(Alice, Marketing))) and at SASE GW2-Map (10.7.7.7, Tenant2, (Optional=(Alice, Marketing)));

(22) John Doe accesses 172.16.8.8 in Tenant1-DC;

(23) ODIP=SASE GW1, OSIP=MNO GW1, IP-Proto=GRE, IDIP=172.16.8.8, ISIP=10.5.5.5, and SASE GW1 maps 10.5.5.5 to Tenant1, SASE GW1 SourceNATs 10.5.5.5 to 172.16.50.5;

(24) OSIP=Tenant1 DC, OSIP=SASE GW1, IP-Proto=GRE, IDIP=172.16.8.8, ISIP=172.16.50.5;

(25) Alice accesses 172.16.8.8 in Tenant2 DC;

(26) ODIP=SASE GW1, OSIP=MNO GW1, IP-Proto=GRE, IDIP=172.16.8.8, ISIP=10.7.7.7, and SASE GW1 maps 10.7.7.7 to Tenant2, SASE GW1 SourceNATs 10.7.7.7 to 172.16.70.7;

(27) OSIP=Tenant2 DC, OSIP=SASE GW1, IP-Proto=GRE, IDIP=172.16.8.8, ISIP=172.16.70.7.

In some cases, it is possible that different tenants may use the same IP address within their respective networks such that a duplicate/overlapping IP address may be used within the enterprise domain. In order to ensure that traffic is forwarded to the proper tenants within the enterprise domain, the SASE domain is able to maintain IP address-to-tenant mappings that enable traffic to be forwarded to the appropriate tenant. In an embodiment, each tenant network is a private network domain and a specific IP address schema is valid within that private network domain. Once the traffic crosses into the private network domain, the SASE gateway is configured to apply tenant-specific Network Address Translation (NAT) to translate received IP addresses to tenant-specific IP addresses that comply with the tenant-specific IP address schema, which allows for seamless communication for tenants even when different tenants use overlapping IP addresses.

Figure 5:
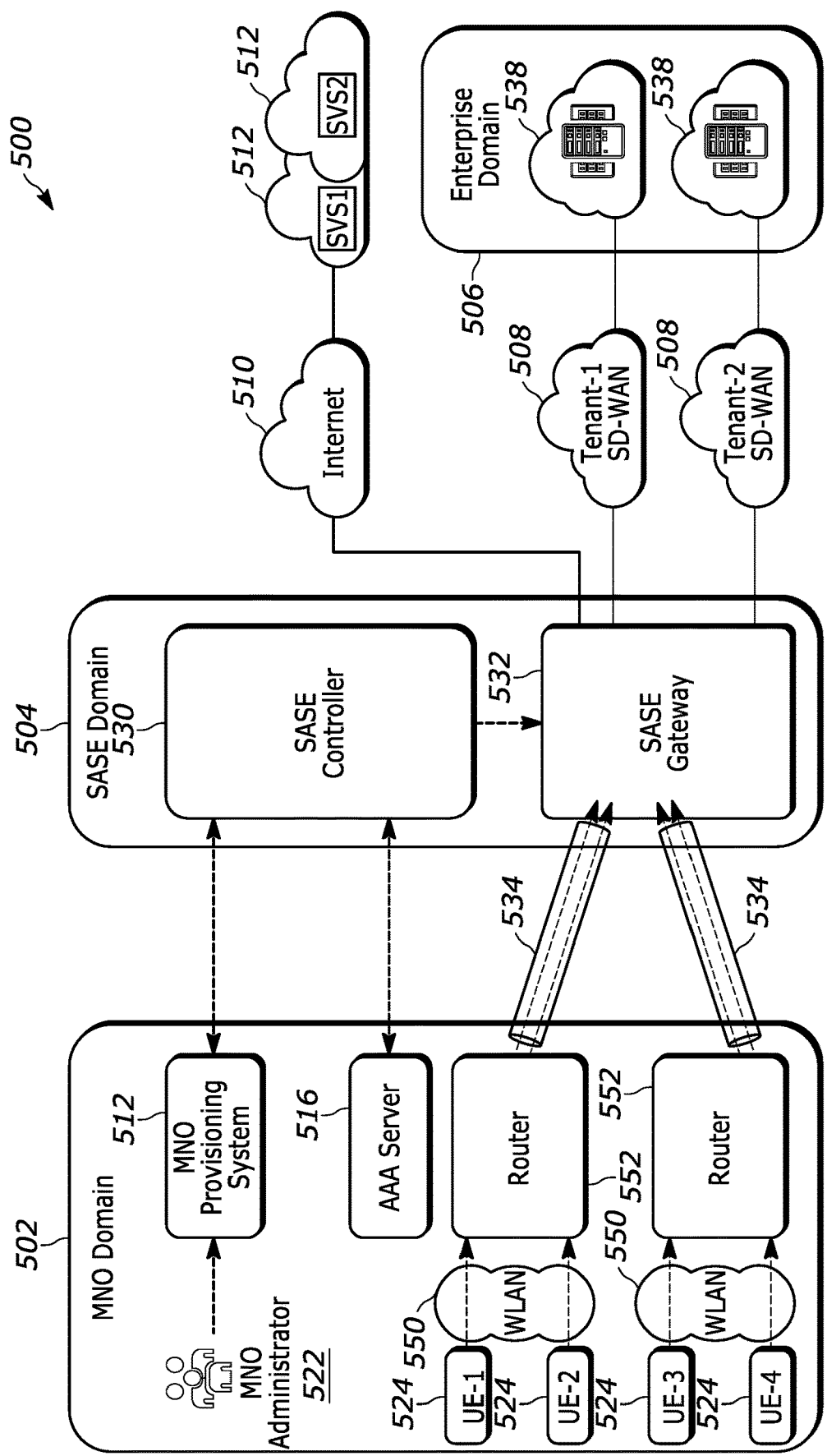
FIG. 5 depicts a network architecture in which the MNO domain includes WLANs and routers, whereas the network architecture of the MNO domain in FIG. 1 includes RANs and MNO gateways.

In the examples described with reference to FIGS. 1-4, access to the MNO is obtained via SIM-based authentication to a RAN. In some cases, an MNO may offer Internet connectivity through wireless LAN (WLAN) technology, often referred to generally as "wireless hotspots" or simply "hotspots." Some hotspots are open to the public and do not require any authentication to join while other hotspots are private and require some form of authentication to join. In an embodiment, the authentication process involved in connecting to an MNO via a private WLAN is used as a proxy of trust for gaining access to a SASE domain. FIG. 5 depicts a network architecture 500 in which the MNO domain 502 includes WLANs 550 and routers 552, whereas the network architecture 100 of the MNO domain 102 in FIG. 1 includes RANs 118 and MNO gateways 120. In an embodiment, the WLAN of the MNO supports 802.1x based techniques to authenticate devices and/or subscribers and to provide wireless network connectivity. For example, the MNO uses 802.1x based authentication with Extensible Authentication Protocol (EAP)-SIM/Authentication and Key Agreement (AKA). As shown in FIG. 5, the WLANs communicate with the AAA server for authentication purposes.

In operation, a device 524 (e.g., UE) detects a WLAN 550 and the WLAN initiates a SIM-based authentication, e.g., using 802.1x. As part of the authentication, the WLAN and the AAA server receive an access ID (e.g., subscriber identity such as IMSI/MSISDN and/or device identity such as IMEI) corresponding to the subscriber and/or the device that is attempting to connect. Once the subscriber/device is authenticated by the MNO, the MNO determines that the device is part of a SASE service (e.g., based on the APN that the device is registered for and authenticated with) and as such traffic associated with the device should be forwarded via a particular SASE APN. In an embodiment, the device can be associated with a SASE service based on subscription information such as APN or an SSID that is associated with the subscription.

Once the subscriber/device is authenticated by the MNO, the AAA server 516 in the MNO domain 502 directs the WLAN 550 to treat the device 524 as belonging to the SASE service. This may be implicit like requesting the Access Point to use a specific VLAN towards the router. The MNO router is also configured appropriately to forward traffic to the SASE gateway.

Once authenticated, the device 524 (e.g., a UE) initiates IP address acquisition using well known protocols like DHCP or IPv6 SLAAC. Next, the corresponding router 552 initiates a RADIUS session (e.g., with a RADIUS Accounting Start message) with the AAA server 516 and a MAC Address or subscriber ID (if known) is used as an access ID for the AAA server. Next, the AAA server communicates the access ID (e.g., subscriber information such as IMSI IMEI, and/or MSISDN) and the corresponding IP address to the SASE controller 530 (and/or the SASE gateway 532). The SASE controller can be notified using, for example, Restful APIs or AAA Accounting Messages (e.g., RADIUS Accounting Start message). Next, the SASE controller maps the assigned IP address to a tenant 538 by correlating the access ID (e.g., subscriber/device information such as IMSI/IMEI) to the tenant. Next, the SASE controller distributes the IP address-to-tenant mapping to the SASE gateways within the SASE domain 504. Additionally, the MNO router is configured to direct all traffic belonging to the devices connected over a specific SSID or device category to the SASE gateway. The MNO routers are connected to SASE gateways and the network connection 534 between MNO routers and the SASE gateway could be a direct connection, an SD-WAN, a GRE tunnel, and/or an IPSec tunnel. In an embodiment, the WLAN or an MNO router chooses a SASE gateway for providing services for the device. The SASE gateway can make use of an access ID (e.g., one or more of a subscriber identifier, device identifier, customer name) which was received earlier in order to apply appropriate traffic policies.

In addition to SIM-based authentication, an MNO may utilize non-SIM based authentication to allow access to the MNO domain. For example, a device may connect to an MNO domain through some other authentication techniques such as a certificate installed on the device, a USB-based authentication module (e.g., an RSA module), a YUBIKEY, or a biometric-based (e.g., fingerprint, face recognition, iris scan) authentication.

In an embodiment that utilizes non-SIM based authentication, the AAA server stores information associating the authentication method into subscriber and customer information. The AAA server distributes the information (e.g., IP address, subscriber information, and device information) to the SASE domain, e.g., SASE controller and/or SASE gateways. When the authenticated device attempts to communicate outside of the MNO domain, packets are sent to the SASE gateway and the SASE gateway associates the IP packets to the previously received subscriber information. The forwarding decisions are made based on the subscriber information.

Techniques described above relate to devices that do not use a client (e.g., client-less devices) to authenticate with the SASE domain. That is, the client-less authentication of the MNO is used by the SASE domain as a proxy for trust. In cases in which a device moves in and out of the MNO domain while connected to the SASE domain, it may be desirable to maintain the connection to the SASE domain and ultimately to the enterprise domain and/or to the Internet. In particular, it may be desirable to maintain connectivity to the SASE domain as a mobile device transitions from client-less connectivity to client-based connectivity and it may be desirable to maintain connectivity to the SASE domain as a mobile device transitions from client-based connectivity to client-less connectivity. In an embodiment in accordance with the invention, a technique for transitioning a wireless device between client-less connectivity and client-based connectivity to a SASE domain involves forwarding traffic from a wireless device through a SASE domain, receiving a request for information related to a SASE gateway in the SASE domain from the wireless device, transmitting information related to the SASE gateway from the SASE domain to the wireless device in response to the request, and transitioning the wireless device between client-less connectivity to the SASE gateway and client-based connectivity to the SASE gateway. Techniques for transitioning a wireless device between client-less connectivity and client-based connectivity to a SASE domain are described with reference to FIGS. 6-8.

Figure 6:
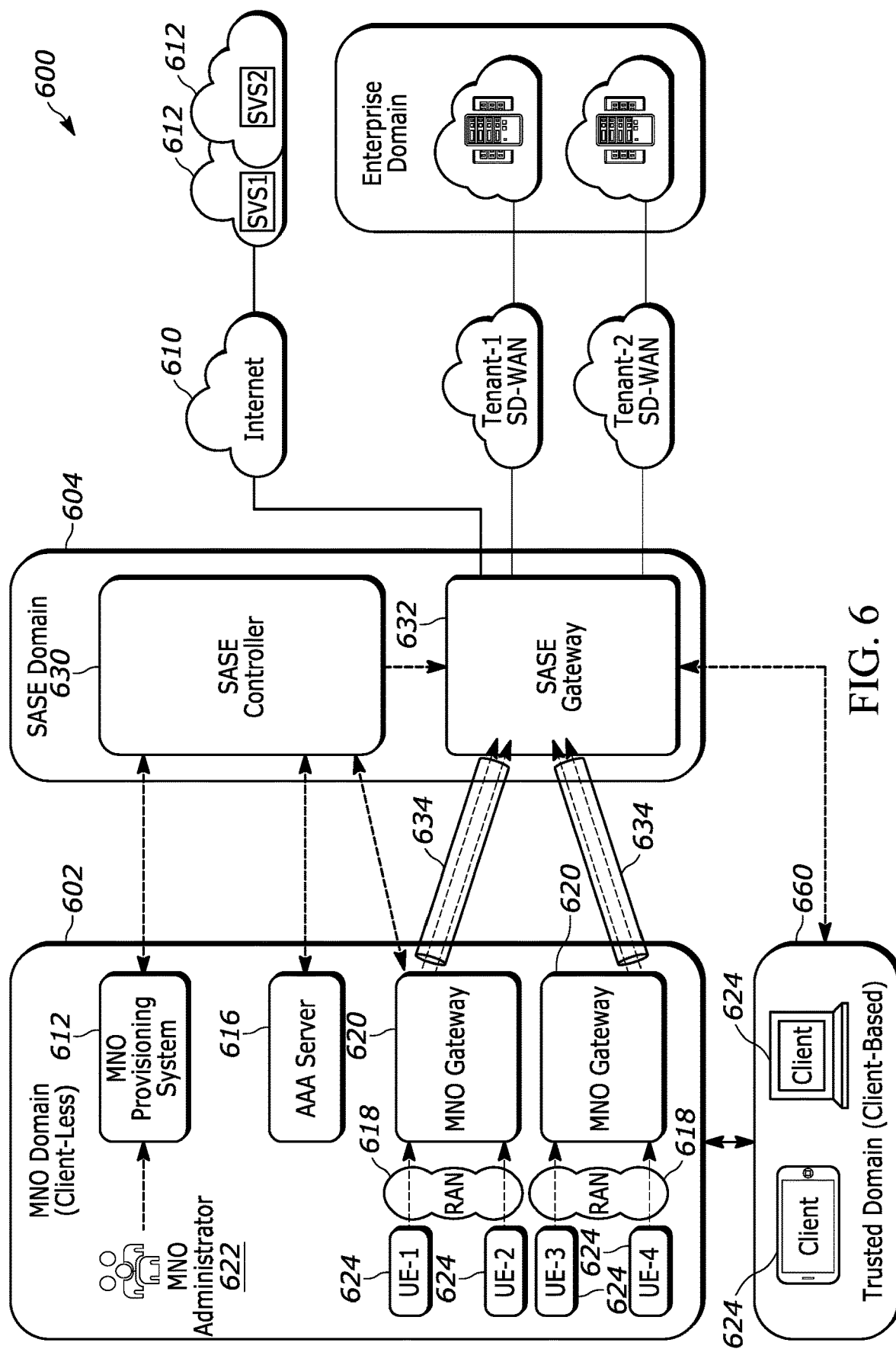
FIG. 6 depicts an example network architecture in which mobile devices make client-less connections and make client-based connections.

A mobile device may be able to engage with a SASE domain via client-less connectivity or client-based connectivity depending on, for example, the location of the mobile device. For example, a mobile device may transition from a client-less connection via an MNO to a client-based connection via a private WI-FI connection as the user of the mobile device transitions from their car to their office building. Likewise, a mobile device may transition from a client-based connection via a private WI-FI connection to a client-less connection via an MNO as the user of the mobile device transitions from their office building to their car. FIG. 6 depicts an example network architecture 600 in which mobile devices 624 make client-less connections (e.g., through an MNO) and make client-based connections through a trusted domain 660, for example, a private WI-FI connection or even through the mobile network. While a mobile device may make a client-less connection or a client-based connection, transitioning between client-less and client-based connections can be difficult and often results in a loss of service continuity.

Figure 7:
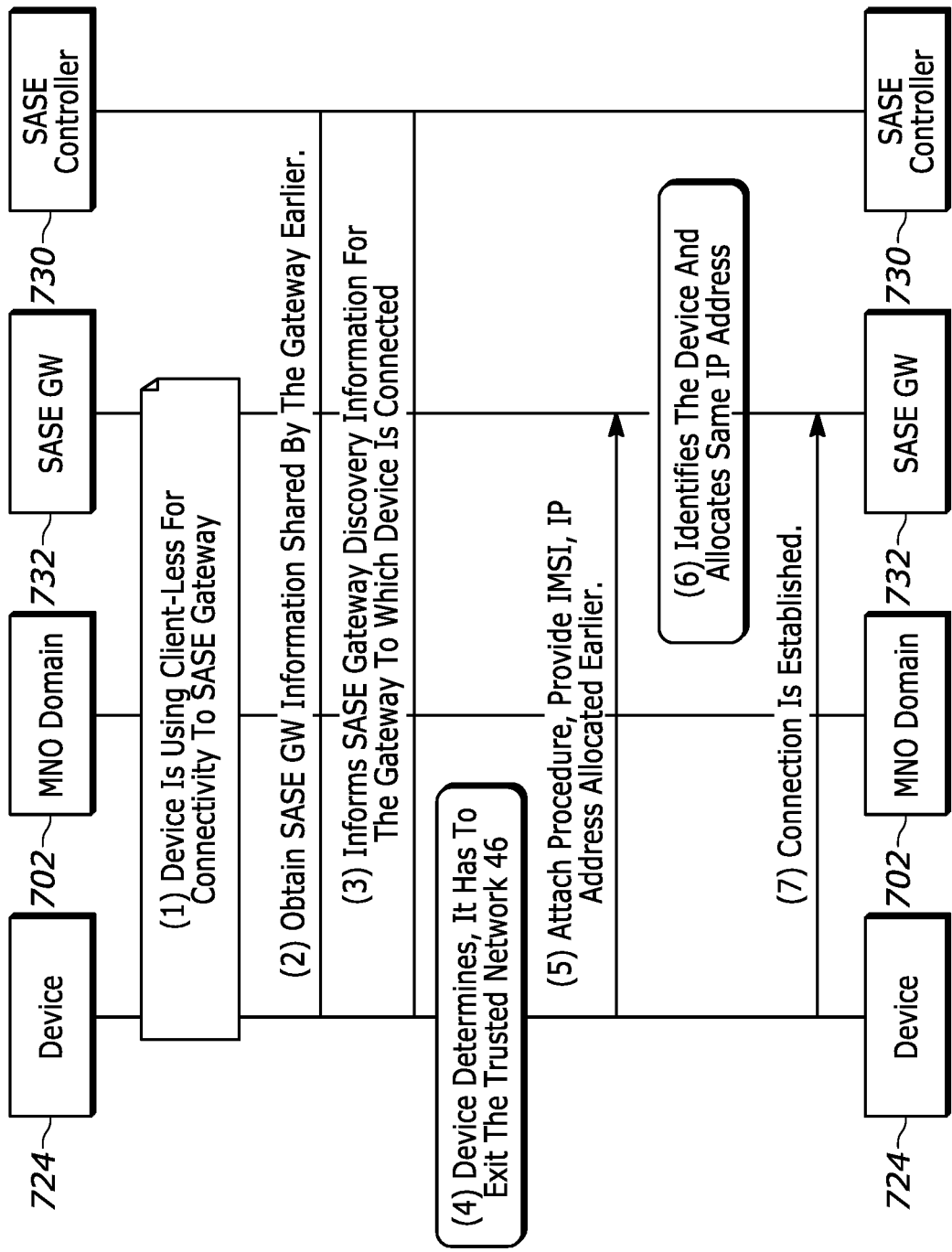
FIG. 7 is a process flow diagram of a technique for transitioning from client-less connectivity to client-based connectivity.

FIG. 7 is a process flow diagram of a technique for transitioning from client-less connectivity to client-based connectivity. In the embodiment of FIG. 7, operations are performed amongst elements in a network architecture similar to the network architecture described above. The elements in the network architecture include (from left to right) a wireless device 724 that includes a SASE client installed on the wireless device, a mobile network of an MNO domain 702, a SASE gateway 732, and a SASE controller 730. In the example of FIG. 7, operations amongst the elements of the network are performed in a sequence as indicated by the numbered operations. The sequence of numbered operations are:

(1) Device uses client-less connectivity to the MNO to connect to SASE gateway;

(2) Device obtains information (e.g., IMSI/IMEI) about SASE gateway that was previously shared by the SASE gateway (In an embodiment, although the device is currently sending data without using an agent or a client, a client running in the background sends the IMSI/IMEI information also for the SASE gateway to register the information.);

(3) SASE controller informs device of SASE gateway information for the SASE gateway to which the device is connected;

(4) Device determines that it is exiting the MNO network;

(5) Device initiates attach procedure with SASE gateway, provides access ID (e.g., IMSI) and IP address (which was allocated by MNO), which aids in discovery and selection of the same SASE gateway to which the wireless device was connected;

(6) SASE gateway identifies the device by the access ID and allocates the same IP address to the device;

(7) A client-based connection is established between the device and the SASE gateway (e.g., the SASE gateway forwarding table is now populated with a corresponding IP address-to-tenant mapping).

Figure 8:
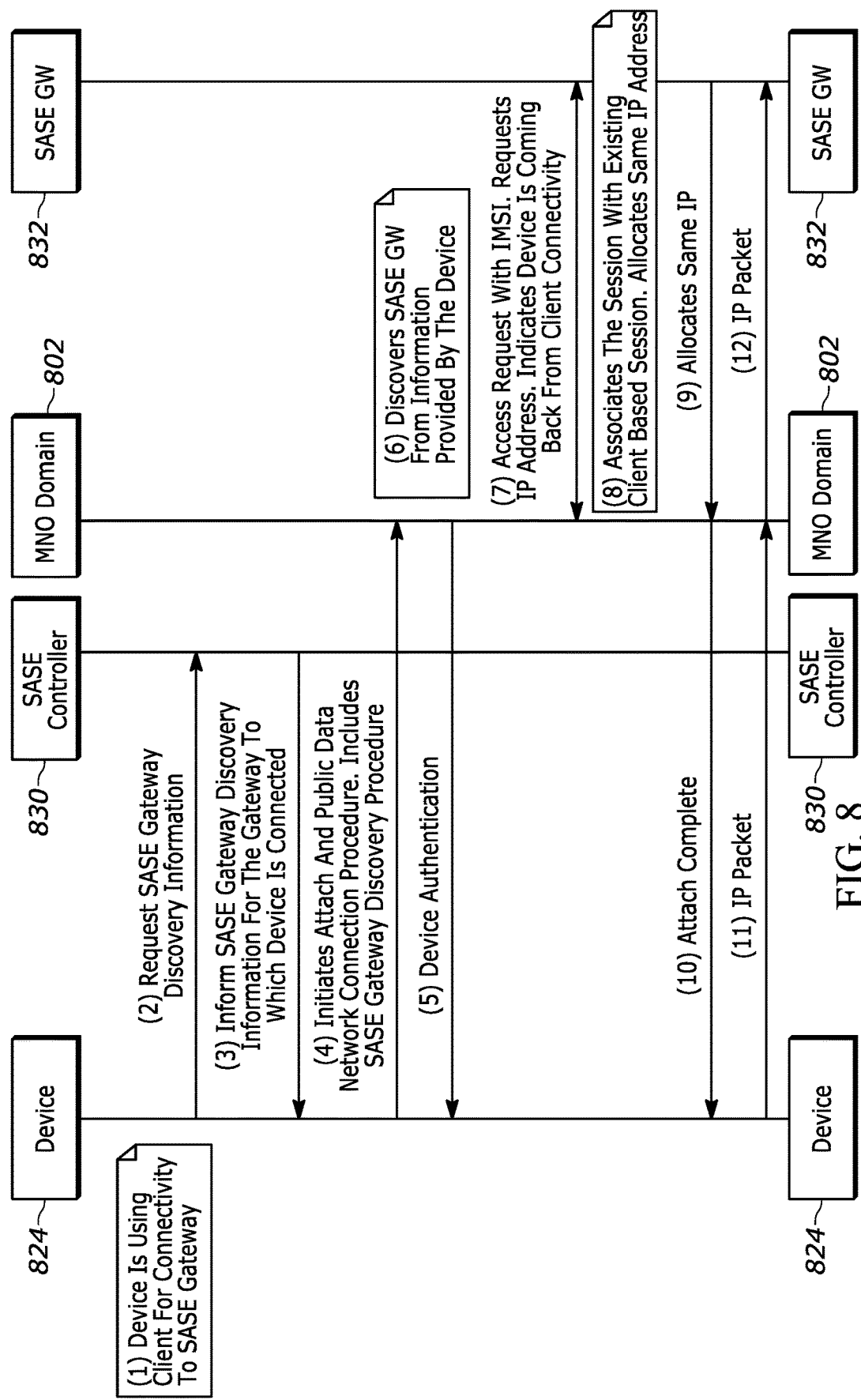
FIG. 8 is a process flow diagram of a technique for transitioning from client-based connectivity to client-less connectivity.

FIG. 8 is a process flow diagram of a technique for transitioning from client-based connectivity to client-less connectivity. In the embodiment of FIG. 8, operations are performed amongst elements in a network architecture similar to the network architecture described above. The elements in the network architecture include (from left to right) a wireless device 824 that includes a SASE client installed on the wireless device, a SASE controller 830, a mobile network of an MNO domain 802, and a SASE gateway 832. In the example of FIG. 8, operations amongst the elements of the network are performed in a sequence as indicated by the numbered operations. The sequence of numbered operations are:

(1) Device uses client-based connectivity to the SASE gateway;

(2) Device requests information (e.g., IP address/Fully Qualified Domain Name (FQDN) of the SASE gateway) about SASE gateway from SASE controller;

(3) SASE controller informs device of SASE gateway information for the SASE gateway to which the device is connected;

(4) Device determines that it is entering the MNO network and initiates an attach procedure with the MNO, which may include transmitting the IP address or the FQDN of the SASE gateway from the device to the MNO domain;

(5) MNO network initiates device authentication procedure;

(6) The MNO network discovers the SASE gateway from information provided by the device (e.g., if the SASE gateway FQDN was provided to the device, then the device starts a DNS query to translate the FQDN to an IP address);

(7) The MNO network makes access request to SASE gateway using access ID (e.g., requests IP address associated with the device, and indicates that the device is transitioning from client-based connection to client-less connection;

(8) The MNO network associates the newly initiated client-less session with the existing client-based session and allocates the same IP address;

(9) The SASE gateway allocates the same IP address to the MNO network;

(10) The MNO completes the attach with the device;

(11) The device transmits an IP packet that passes through the MNO network; and

(12) The MNO network passes the IP packet to the SASE gateway.

Figure 9:
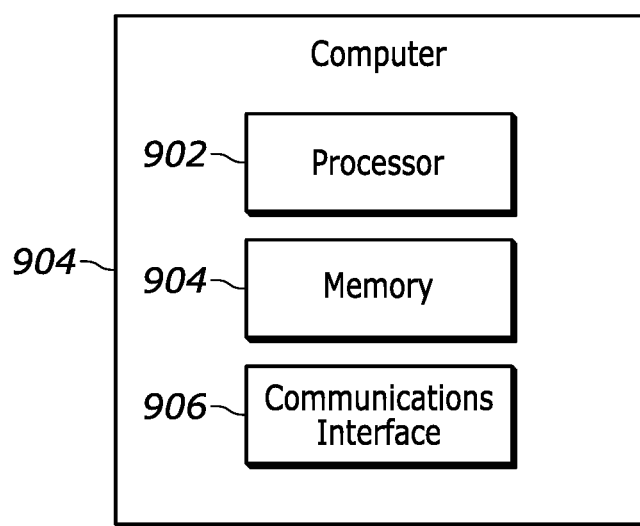
FIG. 9 is a block diagram of a computer that includes a processor, memory, and a communications interface.

In an embodiment, the above-described functionality is performed by a computer or computers (e.g., routers and/or switches) configured to execute computer readable instructions. FIG. 9 is a block diagram of a computer 900 that includes a processor 902, memory 904, and a communications interface 906. The processor may include a multifunction processor and/or an application-specific processor. Examples of processors include the PowerPC™ family of processors by IBM and the x86 family of processors by Intel such as the Xeon™ family of processors and the Intel X5650 processor. The memory within the computer may include, for example, storage medium such as read only memory (ROM), flash memory, RAM, and a large capacity permanent storage device such as a hard disk drive. The communications interface enables communications with other computers via, for example, the Internet Protocol (IP). The computer executes computer readable instructions stored in the storage medium to implement various tasks as described above.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a non-transitory computer-readable storage medium for execution by a computer. As an example, an embodiment of a non-transitory computer-readable storage medium includes a computer useable storage medium configured to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for transitioning a wireless device between client-less connectivity and client-based connectivity, the method comprising:
  forwarding traffic from a wireless device through a Secure Access Service Edge (SASE) domain;
  receiving a request for information related to a SASE gateway in the SASE domain from the wireless device;
  transmitting information related to the SASE gateway from the SASE domain to the wireless device in response to the request; and
  transitioning the wireless device between client-less connectivity to the SASE gateway and client-based connectivity to the SASE gateway.

2. The method of claim 1, wherein transmitting information related to the SASE gateway from the SASE domain to the wireless device involves transmitting an IP address or a Fully Qualified Domain Name (FQDN) from the SASE domain to the wireless device.

3. The method of claim 1, wherein transitioning the wireless device between client-less connectivity to the SASE gateway and client-based connectivity to the SASE gateway involves transitioning the wireless device from client-less connectivity to the SASE gateway to client-based connectivity to the SASE gateway, and wherein the wireless device provides an access ID and IP address to the SASE domain.

4. The method of claim 1, wherein the request for information related to the SASE gateway is sent from the wireless device after the wireless device has established client-less connectivity to the SASE gateway, and wherein transitioning the wireless device involves transitioning the wireless device from the client-less connectivity to client-based connectivity.

5. The method of claim 4, wherein the client-less connectivity to the SASE gateway is established only after a SIM-based authentication with an MNO.

6. The method of claim 5, wherein the client-less connectivity of the wireless device to the SASE gateway involves receiving an access ID-to-IP address mapping at the SASE domain, the access ID-to-IP address mapping corresponding to the wireless device.

7. The method of claim 6, wherein the access ID includes at least one of a subscriber identity and device identifier and wherein the IP address is assigned by the MNO.

8. The method of claim 1, wherein transitioning the wireless device between client-less connectivity to the SASE gateway and client-based connectivity to the SASE gateway involves transitioning the wireless device from client-based connectivity to the SASE gateway to client-less connectivity to the SASE gateway, and wherein the wireless device initiates a connection to an MNO and provides the information related to the SASE gateway to the MNO.

9. The method of claim 8, wherein the client-based connectivity utilizes an IP address that corresponds to the wireless device and wherein the MNO learns the IP address from the SASE domain and uses the same IP address for the client-less connectivity.

10. The method of claim 9, wherein the MNO implements a SIM-based authentication of the wireless device.

11. The method of claim 8, wherein transmitting information related to the SASE gateway from the SASE domain to the wireless device involves transmitting an IP address or a Fully Qualified Domain Name (FQDN) from the SASE domain to the wireless device, and further comprising transmitting the IP address or the FQDN from the wireless device to the MNO domain.

12. The method of claim 1, wherein the request for information related to the SASE gateway is sent from the wireless device after the wireless device has established client-based connectivity, to the SASE gateway, and wherein transitioning the wireless device involves transitioning the wireless device from the client-based connectivity to client-less connectivity.

13. The method of claim 12, wherein the client-less connectivity to the SASE gateway is established only after a SIM-based authentication with an MNO.

14. The method of claim 13, wherein the SIM-based authentication involves at least one of a subscriber identity and device identifier and wherein the IP address is assigned by the MNO.

15. A non-transitory computer readable medium that stores computer readable instructions, which when executed on one or more processors, implements a method for providing secure network connectivity, the method comprising:
forwarding traffic from a wireless device through a Secure Access Service Edge (SASE) domain;
receiving a request for information related to a SASE gateway in the SASE domain from the wireless device;
transmitting information related to the SASE gateway from the SASE domain to the wireless device in response to the request; and
transitioning the wireless device between client-less connectivity to the SASE gateway and client-based connectivity to the SASE gateway.

16. A system for transitioning a wireless device between client-less connectivity and client-based connectivity, the system comprising:
at least one processor and memory that stores computer readable instructions, which when executed on one or more processors, implements a Secure Access Service Edge (SASE) controller and a SASE gateway that are configured to implement a method for providing secure network connectivity, the method comprising
forwarding traffic from a wireless device through the SASE gateway;
receiving a request for information related to the SASE gateway at the SASE controller from the wireless device;
transmitting the information related to the SASE gateway from the SASE controller to the wireless device; and
transitioning the wireless device between client-less connectivity to the SASE gateway and client-based connectivity to the SASE gateway.

* * * * *